US011792764B2

(12) United States Patent
Kim et al.

(10) Patent No.: US 11,792,764 B2
(45) Date of Patent: Oct. 17, 2023

(54) CONFIGURING NUMEROLOGY FOR THE RADIO RESOURCE USED IN TRANSMISSION OF A POSITIONING REFERENCE SIGNAL

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/053,016

(22) PCT Filed: May 2, 2019

(86) PCT No.: PCT/KR2019/005246
§ 371 (c)(1),
(2) Date: Nov. 4, 2020

(87) PCT Pub. No.: WO2019/212246
PCT Pub. Date: Nov. 7, 2019

(65) Prior Publication Data
US 2021/0112522 A1 Apr. 15, 2021

(30) Foreign Application Priority Data

May 4, 2018 (KR) .................. 10-2018-0051674
Apr. 30, 2019 (KR) .................. 10-2019-0050231

(51) Int. Cl.
*H04W 64/00* (2009.01)
*H04L 27/26* (2006.01)
(Continued)

(52) U.S. Cl.
CPC ......... *H04W 64/006* (2013.01); *H04L 5/0051* (2013.01); *H04L 27/2613* (2013.01);
(Continued)

(58) Field of Classification Search
CPC ... H04W 64/006; H04W 8/24; H04W 72/042; H04W 72/0453; H04W 60/06;
(Continued)

(56) References Cited

U.S. PATENT DOCUMENTS

| 2012/0122440 A1 | 5/2012 | Krishnamurthy et al. |
| 2012/0122472 A1 | 5/2012 | Krishnamurthy et al. |

(Continued)

FOREIGN PATENT DOCUMENTS

| CN | 1905546 A | 1/2007 |
| CN | 105122910 A | 12/2015 |

(Continued)

OTHER PUBLICATIONS

Qualcomm Incorporated, "On NPRS performance", R1-1802300, 3GPP TSG RAN WG1 Meeting #92, Athens, Greece, Feb. 26-Mar. 2, 2018, pp. 1-5.

(Continued)

*Primary Examiner* — Ian N Moore
*Assistant Examiner* — Brian T Le
(74) *Attorney, Agent, or Firm* — IP Legal Services, LLC

(57) ABSTRACT

Provided are a method and device for performing positioning in a new radio network. The method of a user equipment for performing positioning may include: receiving configuration information relating to subcarrier spacing within a frequency band through which a positioning reference signal (PRS) is transmitted; and receiving the positioning reference signal on the basis of the configuration information relating to the subcarrier spacing.

12 Claims, 26 Drawing Sheets

(51) Int. Cl.
  *H04L 5/00* (2006.01)
  *H04W 8/24* (2009.01)
  *H04W 72/0453* (2023.01)
  *H04W 72/23* (2023.01)
(52) U.S. Cl.
  CPC ......... *H04L 27/26025* (2021.01); *H04W 8/24* (2013.01); *H04W 72/0453* (2013.01); *H04W 72/23* (2023.01)
(58) Field of Classification Search
  CPC ............ H04W 52/02; H04L 27/26025; H04L 27/2613; H04L 5/0051; H04L 25/0226; H04J 13/00; H04J 13/0055; H04M 1/72406; G06F 9/445
  See application file for complete search history.

(56) References Cited

U.S. PATENT DOCUMENTS

| | | |
|---|---|---|
| 2016/0029331 A1 | 1/2016 | Seo et al. |
| 2018/0048444 A1 | 2/2018 | Park et al. |
| 2018/0049151 A1 | 2/2018 | Yoon et al. |
| 2018/0049169 A1 | 2/2018 | Lin et al. |
| 2019/0045479 A1 | 2/2019 | Yoon et al. |
| 2019/0182884 A1 | 6/2019 | Deenoo et al. |
| 2019/0199498 A1* | 6/2019 | Chen ..................... H04L 5/0007 |
| 2019/0260534 A1 | 8/2019 | Park et al. |
| 2019/0380107 A1 | 12/2019 | Yoon et al. |
| 2020/0059336 A1 | 2/2020 | Park et al. |
| 2020/0236645 A1 | 7/2020 | Yoon et al. |
| 2020/0313822 A1 | 10/2020 | Park et al. |
| 2021/0050986 A1* | 2/2021 | Manolakos ........... H04L 5/0005 |
| 2021/0329724 A1 | 10/2021 | Deenoo et al. |

FOREIGN PATENT DOCUMENTS

| | | |
|---|---|---|
| KR | 10-2018-0018237 A | 2/2018 |
| WO | 2018/031799 A1 | 2/2018 |

OTHER PUBLICATIONS

Huawei et al., "Design of new downlink positioning reference signal for NB-IoT", R1-1608618, 3GPP TSG RAN WG1 Meeting #86bis, Lisbon, Portugal, Oct. 10-14, 2016.

3GPP, "3rd Generation Partnership Project; Technical Specification Group Radio Access Network; NR; Physical channels and modulation (Release 15)", 3GPP TS 38.211 V1.1.3, Nov. 2017, pp. 1-59.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211 V15.1.0, Mar. 2018, pp. 1-222.

Ericsson, "RAN1 open issues based on merged correction on L1 parameters for EN-DC 38.331", R1-1803535, 3GPP TSG RAN WG1 Meeting #92, Athens, Greece, Feb. 26-Mar. 2, 2018.

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.5.0, Mar. 2018, pp. 1-171.

* cited by examiner

FIG.21

PRS-Info

```
-- ASN1 START

PRS-Info ::= SEQUENCE {
        prs-Bandwidth           ENUMERATED { n6, n15, n25, n50, n75, n100, ... },
        prs-ConfigurationIndex  INTERGER (0..4095),
        numDL-Frames            ENUMERATED { sf-1, sf-2, sf-4, sf-6, ..., sf-add-v1420},
        ...,
        prs-MutingInfo-r9       CHOICE {
        prs-BWPIndex            INTEGER (0..3)
        prs_Numerology          ENUMERATED { scs-1, scs-2, scs-3, scs-4, ...}

-- ASN1STOP
```

CONFIGURING NUMEROLOGY FOR THE RADIO RESOURCE USED IN TRANSMISSION OF A POSITIONING REFERENCE SIGNAL

CROSS REFERENCE TO RELATED APPLICATIONS

This application is a National Stage Patent Application of PCT International Patent Application No. PCT/KR2019/005246 (filed on May 2, 2019) under 35 U.S.C. § 371, which claims priority to Korean Patent Application Nos. 10-2018-0051674 (filed on May 4, 2018), and 10-2019-0050231 (filed on Apr. 30, 2019), the teachings of which are incorporated herein in their entireties by reference.

TECHNICAL FIELD

The disclosure relates to methods and devices for measuring the position of a UE in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE), but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE.

In particular, a flexible design is required for transmitting positioning reference signals (PRSs) in order to satisfy requirements of various use cases related to UE positioning required in NR.

DETAILED DESCRIPTION OF THE DISCLOSURE

Technical Problem

The disclosure aims to provide a method for flexibly configuring numerology for the radio resource used in transmission of a positioning reference signal, per time interval or per bandwidth part, in performing positioning in a next-generation wireless network.

The disclosure also aims to provide a method for differently configuring numerology for the radio resource used in transmission of a positioning reference signal based on the UE's capability, in performing positioning in a next-generation wireless network.

The disclosure also aims to provide a method for transmitting/receiving a positioning reference signal even when configuration information for a subcarrier spacing of the frequency band where a positioning reference signal is transmitted is not separately received, in performing positioning in a next-generation wireless network.

Technical Solution

To achieve the foregoing objectives, according to an embodiment, there is a method provided for performing positioning by a user equipment (UE). The method may include receiving configuration information for a subcarrier spacing of a frequency band where a positioning reference signal (PRS) is transmitted and receiving the positioning reference signal based on the configuration information for the subcarrier spacing.

According to an embodiment, there is a method provided for performing positioning by a base station. The method may include configuring configuration information for a subcarrier spacing of a frequency band where a positioning reference signal (PRS) is transmitted and transmitting the positioning reference signal based on the configuration information for the subcarrier spacing.

According to an embodiment, there is a UE provided for performing positioning. The UE may include a receiver receiving configuration information for a subcarrier spacing of a frequency band where a positioning reference signal (PRS) is transmitted and receiving the positioning reference signal based on the configuration information for the subcarrier spacing.

According to an embodiment, a base station may be provided for performing positioning. The base station may include a controller configuring configuration information for a subcarrier spacing of a frequency band where a positioning reference signal (PRS) is transmitted and a transmitter transmitting the positioning reference signal based on the configuration information for the subcarrier spacing.

According to an embodiment, a method may be provided for performing positioning by a UE. The method may include receiving control information related to a downlink channel, determining that subcarrier spacing information for a frequency band where control information is received is subcarrier spacing information for a frequency band where a positioning reference signal is transmitted, and receiving the positioning reference signal based on the determined subcarrier spacing information.

According to an embodiment, a method may be provided for performing positioning by a base station. The method may include transmitting control information related to a downlink channel, configuring subcarrier spacing information for a frequency band where control information is transmitted as subcarrier spacing information for a frequency band where a positioning reference signal is transmitted, and transmitting the positioning reference signal based on the configured subcarrier spacing information.

According to an embodiment, a UE may be provided for performing positioning. The UE may include a receiver receiving control information related to a downlink channel and a controller determining that subcarrier spacing information for a frequency band where control information is received as subcarrier spacing information for a frequency band where a positioning reference signal is transmitted, wherein the receiver receives the positioning reference signal based on the determined subcarrier spacing information.

According to an embodiment, a base station may be provided for performing positioning.

The base station may include a transmitter transmitting control information related to a downlink channel and a controller determining that subcarrier spacing information for a frequency band where control information is transmitted as subcarrier spacing information for a frequency band where a positioning reference signal is transmitted, wherein the transmitter transmits the positioning reference signal based on the configured subcarrier spacing information.

Advantageous Effects

According to the embodiments in the present disclosure, it is possible to provide a reporting resolution for a positioning reference signal suitable for various use scenarios required in NR by flexibly configuring numerology for the radio resource used in transmission of the positioning reference signal, per time interval or per bandwidth part, in performing positioning in a next-generation wireless network.

According to the embodiments in the present disclosure, it is possible to provide an appropriate reporting resolution according to the UE's circumstance by differently configuring numerology for the radio resource used in transmission of a positioning reference signal based on the UE's capability in performing positioning in a next-generation wireless network.

According to the embodiments in the present disclosure, it is possible to transmit/receive a positioning reference signal even when configuration information for a subcarrier spacing of the frequency bandwidth where the positioning reference signal is transmitted is not separately transmitted by transmitting the positioning reference signal using subcarrier spacing information about the frequency bandwidth where predetermined control information has been received, in performing positioning in a next-generation wireless network.

BRIEF DESCRIPTION OF DRAWINGS

FIG. 21 is a view illustrating an example of positioning reference signal configuration information including numerology information and bandwidth part index information according to an embodiment;

MODE FOR CARRYING OUT THE DISCLOSURE

Figure 1:
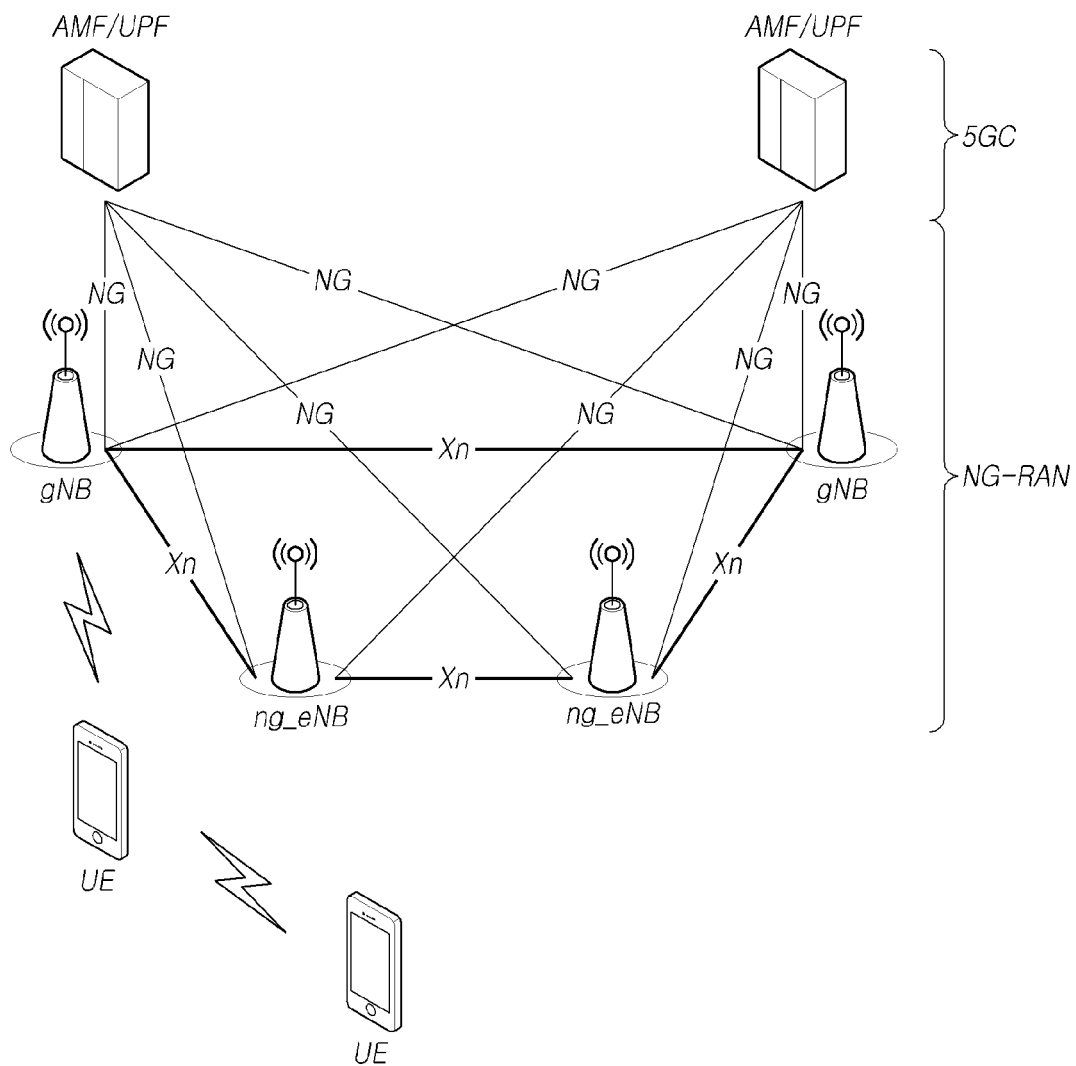
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression. Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station, and the base station may be interpreted as two meanings. The base station may be 1) a device for providing a megacell, a macrocell, a microcell, a picocell, a femtocell, or a small cell or the base station may be 2) a wireless region itself. In the above description 1), the base station may be devices controlled by the same entity and providing predetermined wireless regions or devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP introduced, as a 5G communication technology, i) LTE-A pro by improving the LTE-Advanced technology so as to conform to the requirements of ITU-R and ii) a new NR communication technology that is totally different from 4G communication technology.

LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, an NR wireless communication system employs a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique has been introduced for efficiently multiplexing radio resources based on a plurality of different numerologies.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
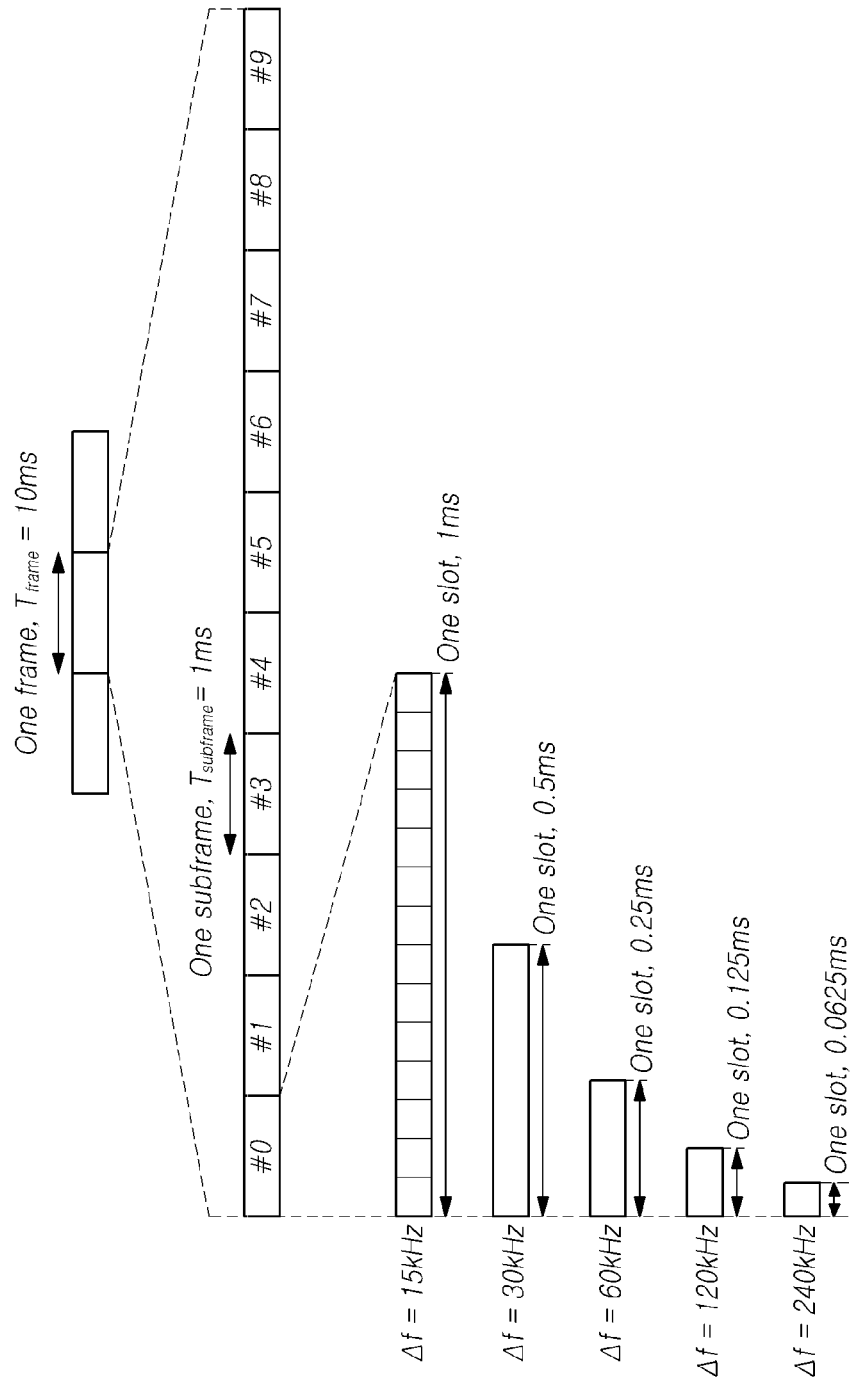
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In the frame structure of NR, a frame is defined to include 10 subframes each having the same length of 1 ms and have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system. Referring to FIG. 2, a slot is made up of 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot is made up of 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port are inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
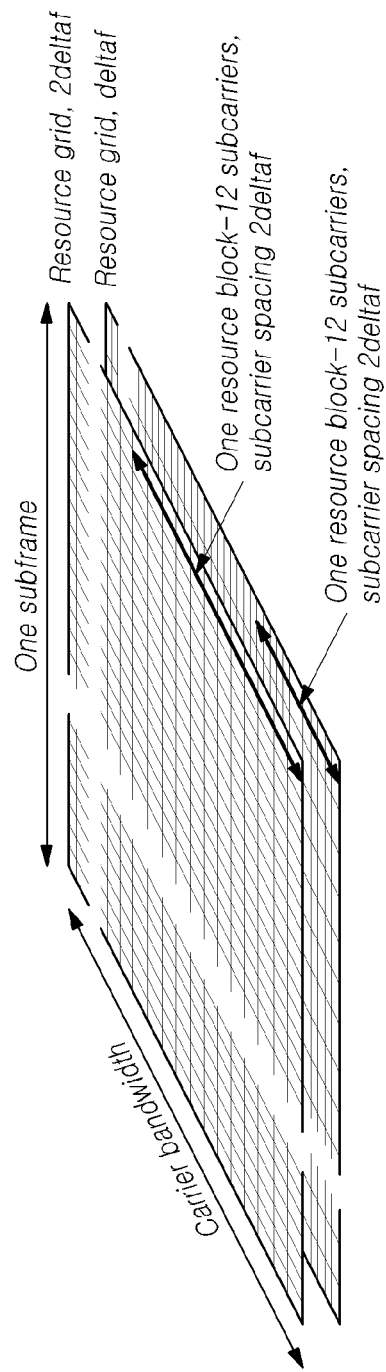
FIG. 3 is a view for explaining resource grids supported by a radio access technology in accordance with embodiments of the disclosure.

FIG. 3 illustrates resource grids supported by a radio access technology.

Referring to FIG. 3, resource grids may vary according to respective numerologies because NR supports a plurality of numerologies in the same carrier. In addition, the resource grids may vary depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may vary according to the subcarrier spacing. Further, "Point A" that acts as a common reference point for the resource block grids, a common resource block, and a virtual resource block are defined in NR.

Figure 4:
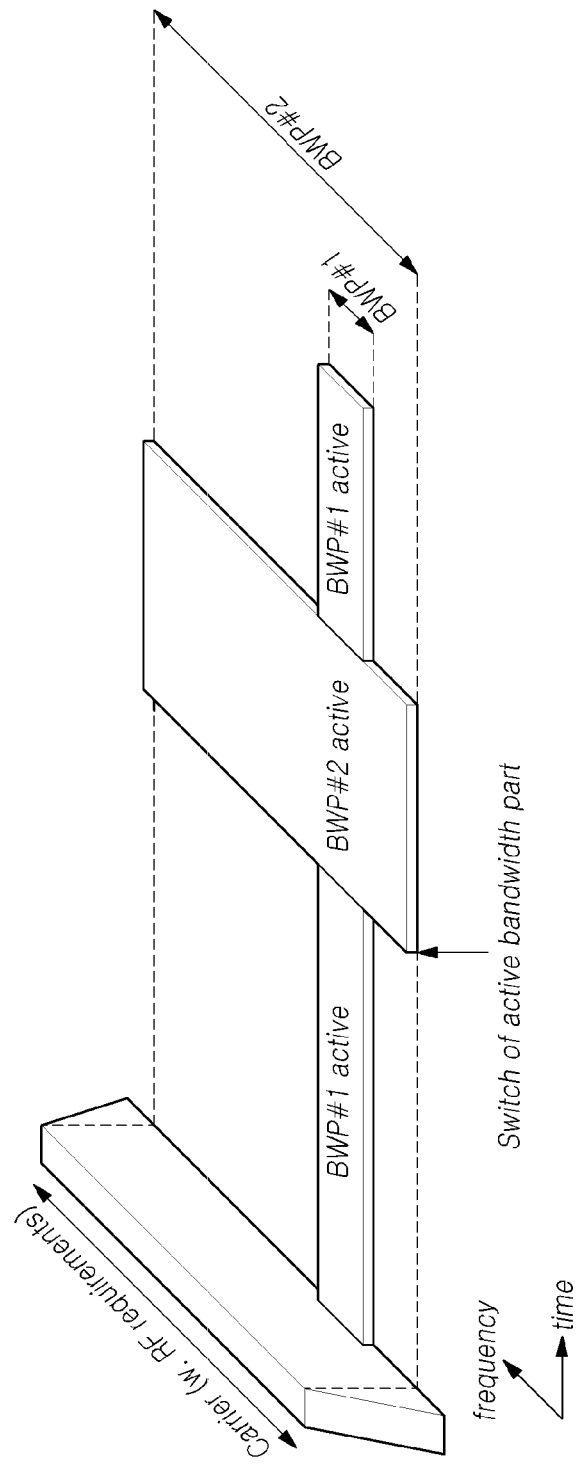
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
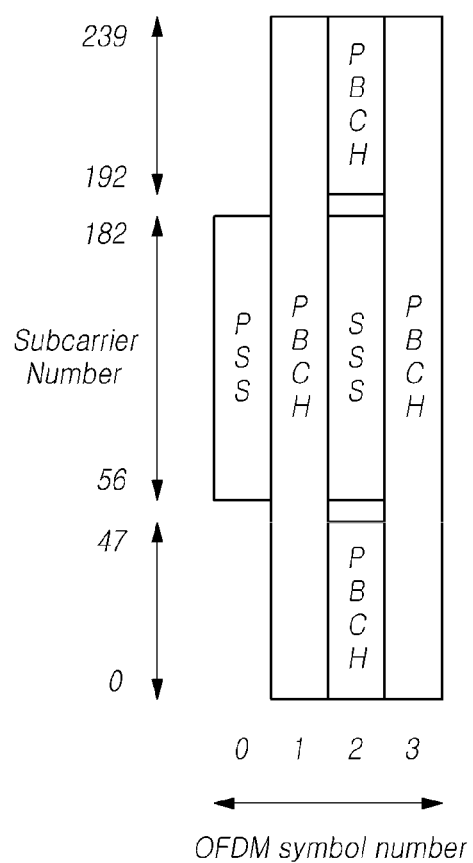
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
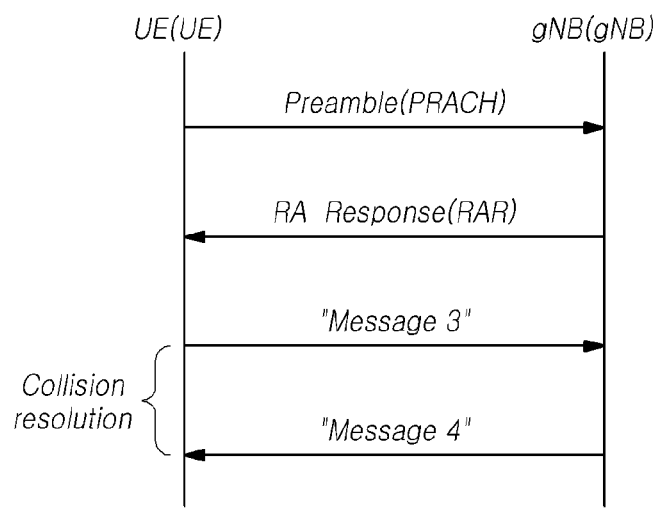
FIG. 6 is a signal diagram for explaining a random access procedure in a radio access technology in accordance with embodiments of the disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
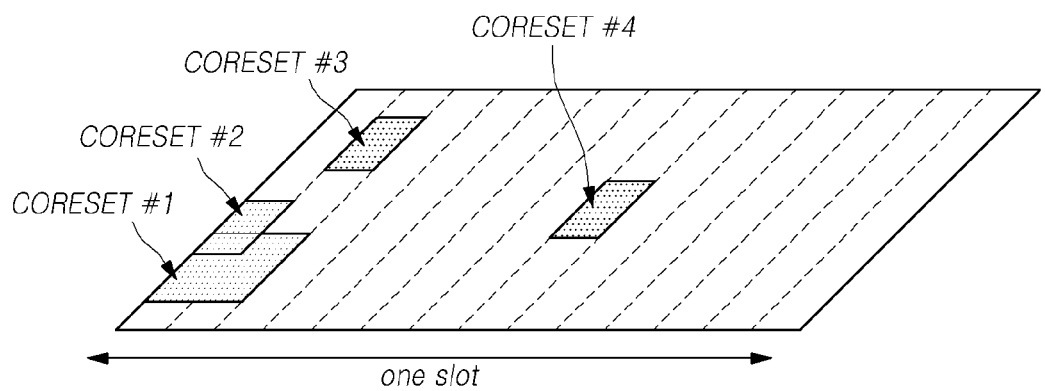
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned, indicated) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Recently, the 3GPP has approved the "Study on New Radio Access Technology", which is a study item for research on next-generation/5G radio access technology. On the basis of the Study on New Radio Access Technology, in RAN WG1, discussions have been in progress on frame structures, channel coding and modulation, waveforms, multiple access schemes, and the like for the NR. It is required to design the NR not only to provide an improved data transmission rate, but also to meet various QoS requirements for each detailed and specific usage scenario, compared to the LTE/LTE-Advanced.

In particular, an enhanced mobile broadband (eMBB), massive machine-type communication (mMTC), and ultra-reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a subframe has been defined as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation. Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, it may be difficult to satisfy latency requirements. To this end, a mini-slot may be defined to be made up of fewer OFDM symbols than the slot. Thus the scheduling for the latency critical data, such as the URLLC, may be performed based on the mini-slot.

Figure 8:
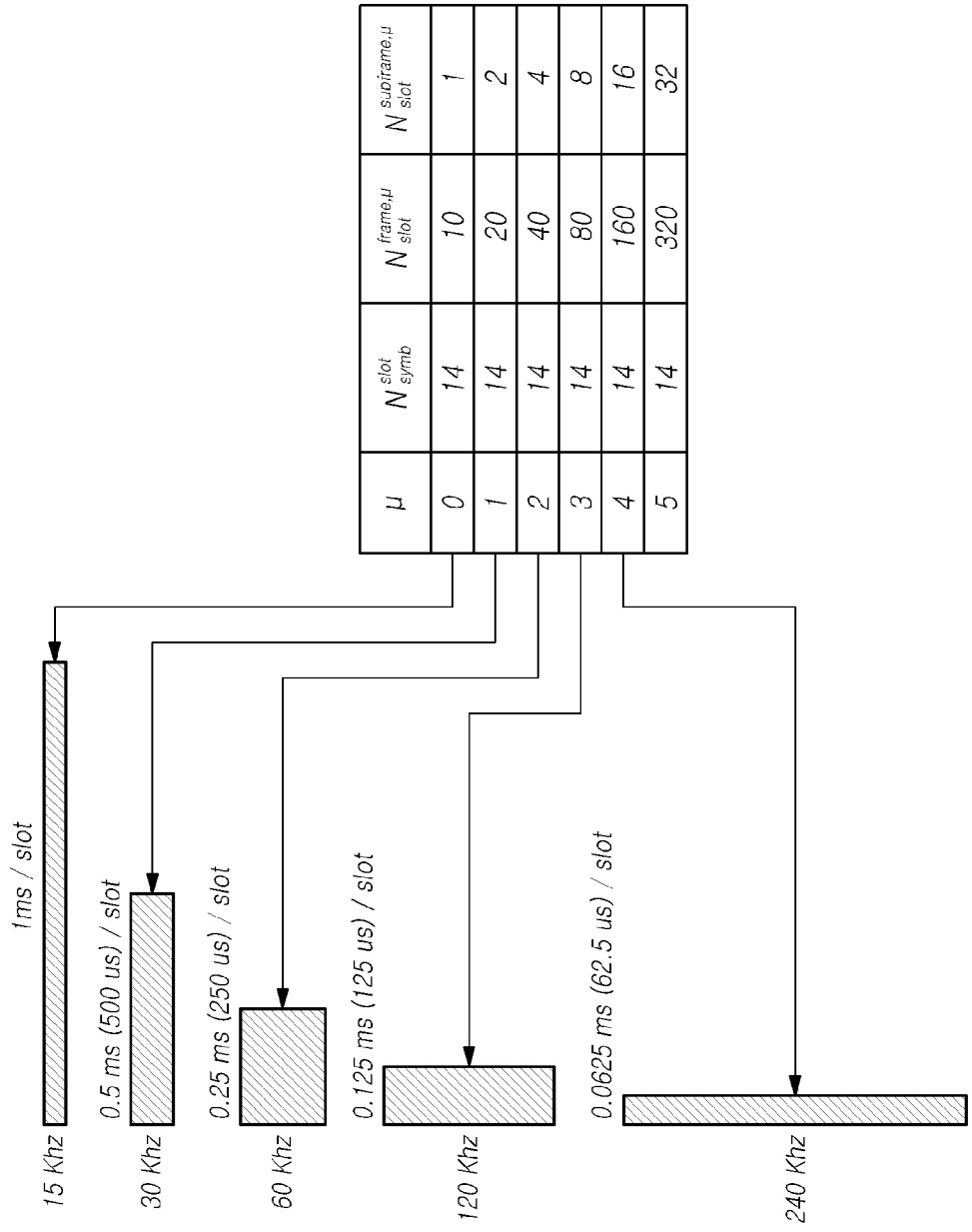
FIG. 8 is a view illustrating an example of symbol level alignment among different subcarrier spacings (SCSs) in accordance with embodiments of the disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

Meanwhile, channel state information (CSI) provides a channel state for a network using a channel state indicator, instead of channel estimation using a typical cell-specific RE (reference signal) (CRS). It is cell-specific, but configured by RRC signaling of a UE. A definition of Channel State Information Reference Signal (CSI-RS) was introduced in LTE Release 10. The CSI-RS is used for allowing a UE to obtain channel state information by estimating demodulation reference signals.

Figure 9:
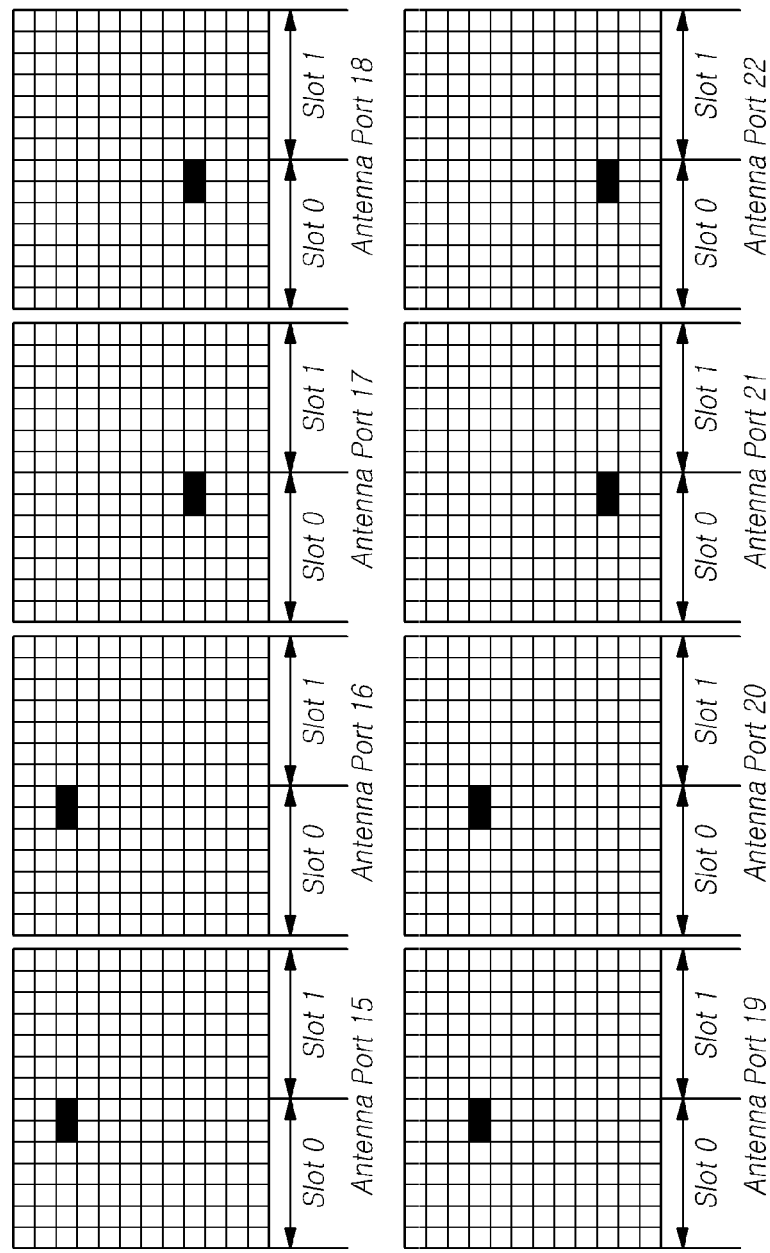
FIG. 9 is a view illustrating an LTE-A CSI-RS structure.

In LTE Rel-8/9, a cell is defined to support a maximum of 4 CRSs. As the LTE evolves from LTE Rel-8/9 to LTE-A (Rel-10), it has been necessary for the CSI to be extended for enabling a cell reference signal to support a maximum 8-layer transmission. Here, antenna ports of 15-22 are allocated as represented in FIG. 9, a transmission periodicity and mapping for resource allocation is determined through RRC configuration. Table 2 defines a mapping method through CSI-RS configuration for normal CP.

TABLE 2

Mapping from CSI reference signal configuration to (k', l') for normal cyclic

| CSI reference signal configuration | | Number of CSI reference signals configured | | | | |
|---|---|---|---|---|---|---|
| | | 1 or 2 | | 4 | | 8 |
| | | (k', l') | $n_3$ mod 2 | (k', l') | $n_3$ mod 2 | (k', l') | $n_3$ mod 2 |
| Frame structure type 1 and 2 | 0 | (9.5) | 0 | (9.5) | 0 | (9.5) | 0 |
| | 1 | (11.2) | 1 | (11.2) | 1 | (11.2) | 1 |
| | 2 | (9.2) | 1 | (9.2) | 1 | (9.2) | 1 |
| | 3 | (7.2) | 1 | (7.2) | 1 | (7.2) | 1 |
| | 4 | (9.5) | 1 | (9.5) | 1 | (9.5) | 1 |
| | 5 | (8.5) | 0 | (8.5) | 0 | | |

TABLE 2-continued

Mapping from CSI reference signal configuration to (k', l') for normal cyclic

| CSI reference signal configuration | | Number of CSI reference signals configured | | | | |
|---|---|---|---|---|---|---|
| | | 1 or 2 | | 4 | | 8 |
| | | (k', l') | $n_3$ mod 2 | (k', l') | $n_3$ mod 2 | (k', l') | $n_3$ mod 2 |
| | 6 | (10.2) | 1 | (10.2) | 1 | | |
| | 7 | (8.2) | 1 | (8.2) | 1 | | |
| | 8 | (6.2) | 1 | (6.2) | 1 | | |
| | 9 | (8.5) | 1 | (8.5) | 1 | | |
| | 10 | (3.5) | 0 | | | | |
| | 11 | (2.5) | 0 | | | | |
| | 12 | (5.2) | 1 | | | | |
| | 13 | (4.2) | 1 | | | | |
| | 14 | (3.2) | 1 | | | | |
| | 15 | (2.2) | 1 | | | | |
| | 16 | (1.2) | 1 | | | | |
| | 17 | (0.2) | 1 | | | | |
| | 18 | (3.5) | 1 | | | | |
| | 19 | (2.5) | 1 | | | | |
| Frame structure type 2 only | 20 | (11.1) | 1 | (11.1) | 1 | (11.1) | 1 |
| | 21 | (9.1) | 1 | (9.1) | 1 | (9.1) | 1 |
| | 22 | (7.1) | 1 | (7.1) | 1 | (7.1) | 1 |
| | 23 | (10.1) | 1 | (10.1) | 1 | | |
| | 24 | (8.1) | 1 | (8.1) | 1 | | |
| | 25 | (6.1) | 1 | (6.1) | 1 | | |
| | 26 | (5.1) | 1 | | | | |
| | 27 | (4.1) | 1 | | | | |
| | 28 | (3.1) | 1 | | | | |
| | 29 | (2.1) | 1 | | | | |
| | 30 | (1.1) | 1 | | | | |
| | 31 | (0.1) | 1 | | | | |

In the NR, the X-port CSI-RS has been finally defined as being allocated to N consecutive/non-consecutive OFDM symbols. Here, the X-ports are CSI-RS ports, where X is a maximum of 32. The CSI-RS is allocated over the N symbols, where N is a maximum of 4.

Figure 10:
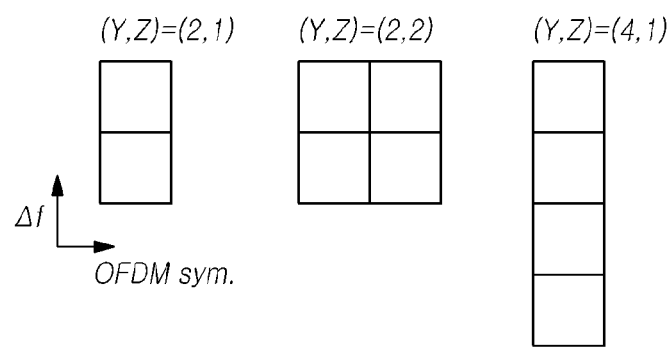
FIG. 10 is a view illustrating NR component CSI-RS RE patterns.

Basically, the CSI-RS has three component resource element (RE) patterns in total as illustrated in FIG. 10. Y and Z represent lengths on the time and frequency axes of CSI-RS RE patterns, respectively.

(Y,Z)∈{(2,1),(2,2),(4,1)}

Figure 11:
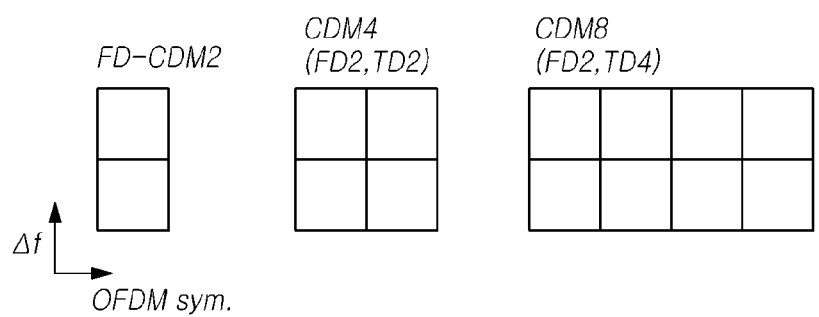
FIG. 11 is a view illustrating NR CDM patterns.

Further, three CDM patterns in total are supported in the NR as illustrated in FIG. 11.

FD-CDM2, CDM4(FD2,TD2), CDM8(FD2,TD4)

Here, following Tables 3 to 6 represent spreading sequences allocated to each CDM pattern in actual.

TABLE 3

The sequences $w_f(k')$ and $w_f(l')$ for CDMType equal to 'no CDM'

| Index | $w_f(k')$ | $w_f(l')$ |
|---|---|---|
| 0 | 1 | 1 |

TABLE 4

The sequences $w_f(k')$ and $w_f(l')$ for CDMType equal to 'FD-CDM2'

| Index | $w_f(k')$ | $w_f(l')$ |
|---|---|---|
| 0 | [+1 +1] | 1 |
| 1 | [+1 −1] | 1 |

TABLE 5

The sequences for $w_t(k')$ and $w_t(l')$ CDMType equal to 'CDM4'

| Index | $w_t(k')$ | $w_t(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 6

The sequences $w_t(k')$ and $w_t(l')$ for CDMType equal to 'CDM8'

| Index | $w_t(k')$ | $w_t(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

Figure 12:
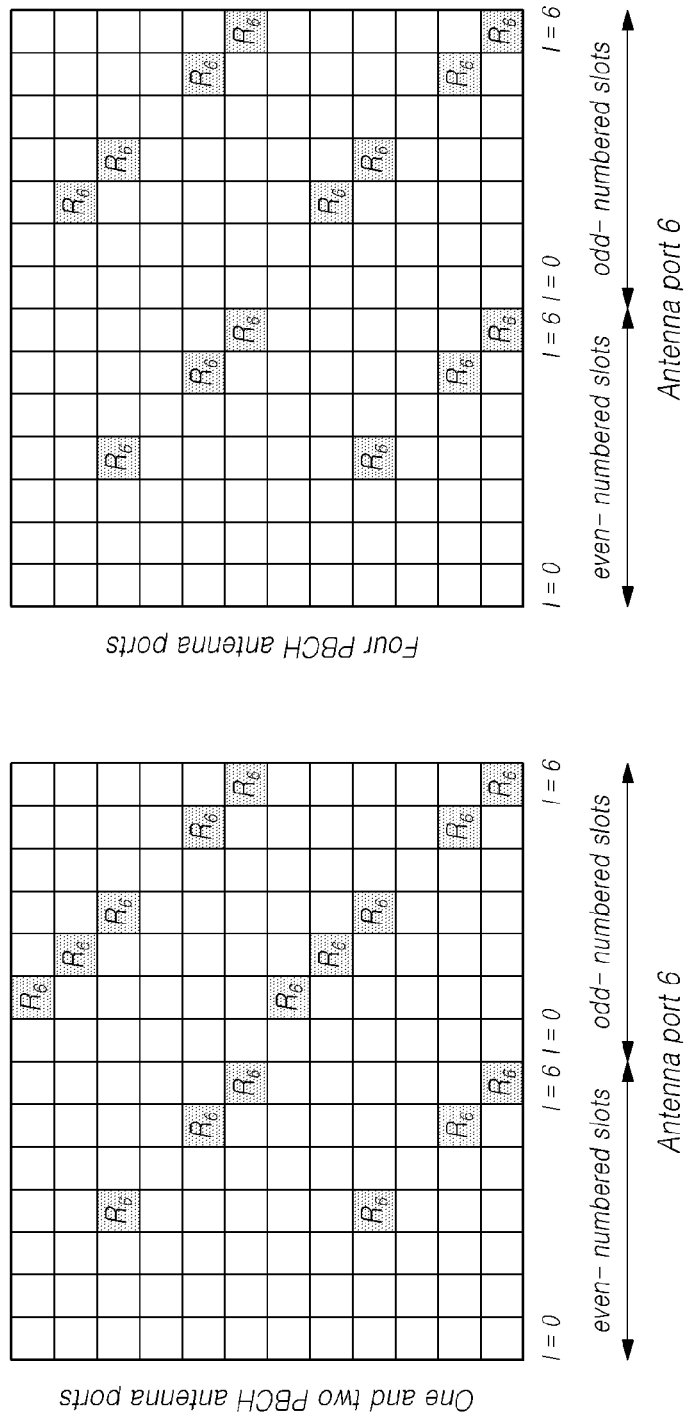
FIG. 12 is a view illustrating mapping of positioning reference signals in case of normal cyclic prefix.

In the LTE, higher-layer signaling may be transmitted via antenna port 6 as illustrated in FIG. 12. Through this, a UE performs position measurement. Basically, a PRS is transmitted to a pre-defined area through higher-layer signaling parameter configuration.

ΔPRS: subframe offset

TPRS: periodicity, 160, 320, 640, 1280 subframes

NPRS: duration (=No. of consecutive subframes), 1, 2, 4, 6 subframes

Basically, the PRS uses a pseudo random sequence, that is, a quasi-orthogonal characteristic sequence. That is, PRS sequences that overlap over code may be separated using this orthogonal characteristic. In frequency domain, as shown in FIG. 12, a total of 6 cells including 5 neighboring cells may be orthogonally allocated using frequency reuse factor=6. Here, a physical cell ID ("PCI") is basically used as an offset value for a frequency domain position of a PRS RE.

Finally, since a collision occurs in case all target cells configure an identical PRS transmission interval in the time domain, PRS transmission may be performed at an orthogonal time interval between specific cells or cell groups by configuring a muting interval per cell.

Figure 13:
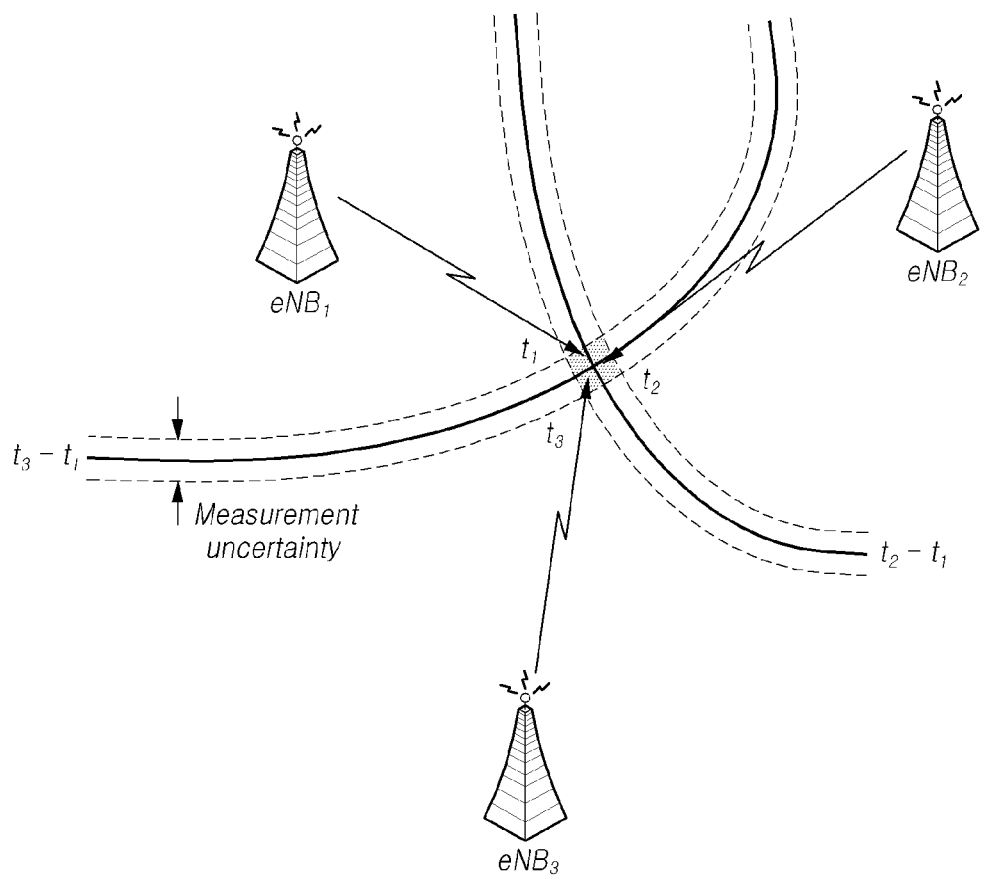
FIG. 13 is a view conceptually illustrating OTDOA-based positioning.

Observed Time Difference Of Arrival (OTDOA) is a representative technique of estimating a received signal time difference (RSTD), which is a difference in time between received signals as a basic principle for position measurement. Its basic principle is such that a position of a UE may be estimated by estimating an overlapping area based on time differences from at least 3 cells as shown in FIG. 13. For the PRS, PRS transmission information for a maximum of 24×3 (3-sectors) cells may be configured for a UE through higher-layer signaling.

Further, the UE is required to report RSTD values estimated for each cell to a corresponding base station. Following Table 7 represents values used for reporting time difference values estimated by the UE.

Basically, intervals from −15391 Ts to 15391 Ts are defined as a reporting range. Up to −4096 Ts ≤ RSTD ≤ 4096 ≤ Ts have 1 Ts resolution, and the remaining intervals have 5 Ts resolution.

TABLE 7

RSTD report mapping

| Reported Value | Measured Quantity Value | Unit |
|---|---|---|
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

Additionally, reporting for high resolution is also included in the corresponding standard as in Table 7. These values may be transmitted along with previously estimated RSTD, and reporting using RSTD_delta_0, RSTD_delta_1 is available in −2260 Ts≤RSTD≤10451 Ts, while reporting using all values except for RSTD_delta_1 is available in the intervals of 0000 Ts≤RSTD≤2259 Ts and 10452 Ts≤RSTD≤12711 Ts. Here, 1 Ts is about 9.8m. The following is a method of calculating based on 15 kHz that is the subcarrier-spacing of the LTE.

SCS=15 kHz, a reference OFDM symbol length=66.7 us
2048 samples are generated on the time axis based on 2048 FFT (oversampling not applied)
a length per sample on the time axis (=1 Ts)=66.7 us/2048 samples in time*(3*108 m/s)=9.8m

TABLE 8

Relative quantity mapping for higher-resolution RSTD measurement reporting

| Reported Relative Qkuantity Value | Measured Relative Quantity Value, $\Delta_{RSTD}$ | Unit |
|---|---|---|
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

There is no method introduced for transmitting a positioning reference signal (PRS), which satisfies resolution requirements for various use cases considered in NR positioning. The present disclosure introduces a method for transmitting a positioning reference signal (PRS) considering multiple numerologies in 5G NR.

Hereinafter, a method for configuring positioning reference signal (PRS) transmission numerology considering per-use case resolution requirements will be described with reference to the relevant drawings.

Figure 14:
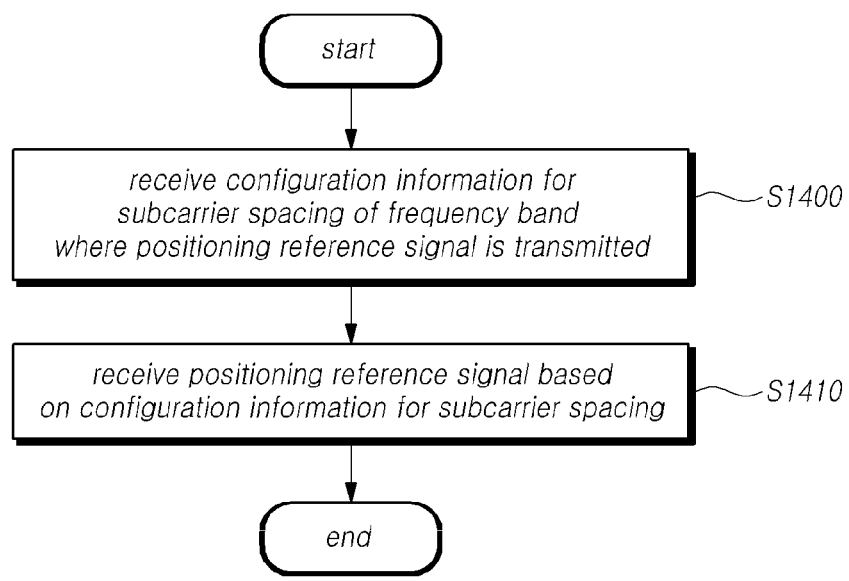
FIG. 14 is a flowchart illustrating a procedure of a UE for performing positioning according to an embodiment.

FIG. 14 is a flowchart illustrating a procedure of a UE for performing positioning according to an embodiment.

Referring to FIG. 14, the UE may receive configuration information for a subcarrier spacing of the frequency band where a positioning reference signal (PRS) is transmitted (S1400).

According to an embodiment, the positioning reference signal (PRS) may be configured based on various numerologies to support different resolutions in relation to transmission of the positioning reference signal (PRS) for positioning of the UE. NR provides a total of five subcarrier spacings corresponding to 15 kHz, 30 kHz, 60 kHz, 120 kHz, and 240 kHz.

In NR, one subframe may be typically configured of 1 ms, and one slot may be made up of 14 symbols. For example, where the subcarrier spacing is 15 kHz, one subframe is configured of one slot and may thus be made up of 14 symbols. If the subcarrier spacing is 30 kHz, one subframe is configured of two slots and may thus be made up of 28 symbols.

In this case, as described above, in the subcarrier spacing (SCS) of 15 kHz, one sample may have a resolution value of about 9.8m. The number of time samples for each single OFDM symbol may be set to the same number for each subcarrier spacing. Thus, where the subcarrier spacing is 30 kHz, the time per OFDM symbol is reduced in half, so that a resolution of about 9.8/2=4.9m may be supported for each single sample.

Likewise, where the subcarrier spacing is 60 kHz, the time per OFDM symbol is reduced again in half so that a resolution of about 9.8/22m may be supported for each single sample. Likewise, where the subcarrier spacing is 120 kHz, the time per OFDM symbol is reduced again in half so that a resolution of about 9.8/23m may be supported for each single sample. Likewise, where the subcarrier spacing is 240 kHz, the time per OFDM symbol is reduced again in half so that a resolution of about 9.8/24m may be supported for each single sample. That is, the larger subcarrier spacing value the numerology has, the smaller resolution value one time sample of positioning reference signal (PRS) provides. Thus, the resolution of positioning may increase.

According to an embodiment, the numerology of the frequency band where the positioning reference signal (PRS) is transmitted may be configured based on the resolution of the positioning reference signal (PRS) required per use case. According to an embodiment, the configuration information for the subcarrier spacing for transmission of the positioning reference signal (PRS) may be received via higher layer signaling. According to an embodiment, the configuration information for the subcarrier spacing for transmission of the positioning reference signal (PRS) may be received via a downlink control channel or downlink data channel.

In NR, two subcarrier spacings with respect to a transmission frequency of 6 GHz are used for transmission of data or a reference signal (RS). Selection of two subcarrier spacings may be performed with respect to the transmission frequency of 6 GHz for the positioning reference signal (PRS).

For example, where the transmission frequency is less than 6 GHz, the subcarrier spacing may be set to 15 kHz or 30 kHz. At this time, the case where the subcarrier spacing is 15 kHz may be selected when a relatively low resolution is required for the positioning reference signal (PRS). The case where the subcarrier spacing is 30 kHz may be selected when a relatively high resolution is required for the positioning reference signal (PRS).

Likewise, where the transmission frequency is not less than 6 GHz, the subcarrier spacing may be set to 60 kHz or 120 kHz. At this time, the case where the subcarrier spacing is 60 kHz may be selected when a relatively low resolution is required for the positioning reference signal (PRS). The case where the subcarrier spacing is 120 kHz may be selected when a relatively high resolution is required for the positioning reference signal (PRS).

According to an embodiment, where the UE simultaneously supports a band not more than 6 GHz and an mmWave band which is not less than 6 GHz, the UE may integrate all the numerologies and apply a resolution per a use case. That is, in the case where the transmission frequency is less than 6 GHz, if a first resolution is required, the subcarrier spacing may be selected as 15 kHz. Where a second resolution higher than the first resolution is required, the subcarrier spacing may be selected as 30 Hz. In the case where the transmission frequency is 6 GHz or more, if a third resolution is required, the subcarrier spacing may be selected as 60 kHz. Where a fourth resolution is required, the subcarrier spacing may be selected as 120 kHz.

According to an embodiment, upon transmission of the positioning reference signal (PRS), a different numerology may be configured per transmission interval according to each use case, with respect to the single bandwidth part (BWP). For example, configuration of different numerologies and transmission of the positioning reference signal (PRS) based on TDM may be rendered possible. That is, in the same bandwidth part among a plurality of bandwidth parts constituting the system bandwidth, a positioning reference signal (PRS) transmission interval with a different resolution per time interval may be configured. In this case, numerology information and time interval information may be added to the positioning reference signal (PRS) configuration information.

Thus, positioning reference signals (PRS) with different resolutions may be transmitted in different time intervals even in the single bandwidth part (BWP). At this time, adjustment of different resolutions may be achieved via numerology, as described above, under the assumption that the positioning reference signal (PRS) patterns are the same.

According to an embodiment, where the positioning reference signal (PRS) is transmitted based on multiple bandwidth parts (BWPs), a different numerology may be configured per bandwidth part (BWP) depending on the use case. Multiple BWP simultaneous transmission-based different numerologies may be configured and, thus, the positioning reference signal (PRS) may be transmitted.

According to an embodiment, the positioning reference signal (PRS) may be transmitted simultaneously in all the bandwidth parts (BWPs). For example, in a first bandwidth part, the positioning reference signal (PRS) may be transmitted, with the subcarrier spacing set to 120 kHz. In a second bandwidth part, the positioning reference signal (PRS) may be transmitted, with the subcarrier spacing set to 15 kHz. Likewise, the positioning reference signal (PRS) may be transmitted, with the subcarrier spacing set to 30 kHz in a third bandwidth part and the subcarrier spacing set to 60 kHz in a fourth bandwidth.

That is, the base station may configure and transmit the positioning reference signal (PRS) based on a different numerology per bandwidth part (BWP). By so doing, positioning reference signals (PRSs) satisfying various resolution requirements may be simultaneously transmitted.

In this case, since configuration information may be received via each bandwidth part (BWP) for the positioning reference signal (PRS), it is not required to transmit separate higher layer configuration information for transmission of the positioning reference signal (PRS). However, even in this case, bandwidth part (BWP) index and numerology value, other than the existing positioning reference signal (PRS) configuration information, may be included.

However, this is merely an example, and embodiments of the disclosure are not limited thereto. For example, the base station may configure and transmit the positioning reference signal (PRS) based on different numerologies according to the UE's capability and use cases for some of the plurality of bandwidth parts (BWPs) constituting the system bandwidth.

For example, the base station may transmit the positioning reference signal (PRS) based on the numerology satisfying several resolution requirements considering the capability of each UE. The base station may perform simultaneous transmission by simultaneously repeating positioning reference signals (PRSs), which have the same resolution requirement, on several bandwidth parts (BWPs).

Referring back to FIG. 14, the UE may receive the positioning reference signal based on the configuration information for subcarrier spacing (S1410).

The UE may receive the positioning reference signal based on the configuration information for the configuration information for the subcarrier spacing received from the base station. According to an embodiment, the UE may further receive configuration information for the transmission bandwidth for the positioning reference signal from the base station, receiving the positioning reference signal. For example, it is assumed that, for each UE, PDSCH reception is performed via any activated bandwidth part (BWP). In this case, each UE may activate a specific bandwidth part (BWP) configured to transmit the positioning reference signal for UE positioning and receive the positioning reference signal.

According to an embodiment, where multiple bandwidth parts (BWP) are configured, each UE may activate multiple specific bandwidth parts (BWPs) configured to transmit the positioning reference signal for UE positioning and receive the positioning reference signal. In this case, in a specific bandwidth, the UE may receive the positioning reference signal in the radio resource allocated to transmission of the positioning reference signal based on the configuration information for the positioning reference signal transmission pattern.

The NR UE may detect the positioning reference signal (PRS) based on the UE's capability. For example, the positioning reference signal (PRS) may be detected based on the UE's capability. Whether the UE receives the multiple bandwidth parts (BWPs) for reception of the positioning reference signal (PRS), the UE's positioning reference signal (PRS) processing time, and reporting capability may be considered as the UE's capability.

According to an embodiment, it is assumed that the UE may support the function of receiving multiple bandwidth parts (BWPs) as well as receiving a single bandwidth part (BWP). Also assumed is that there may be mixed UEs supporting only UE bandwidth part (BWP) and UEs supporting multiple bandwidth parts (BWPs) as well, depending on the UE's capability.

The UE which supports single bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As example, the UE which supports multiple bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As another example, the UE may receive the positioning reference signal (PRS) in all the bandwidth parts (BWPs) supported in the positioning reference signal (PRS) configuration information. That is, regardless of the use cases for the UE itself, the UE may perform detection on the bandwidth parts (BWPs) where all the positioning reference signals (PRSs) are transmitted. If the structure is such that the same numerology-based positioning reference signal (PRS) is repeatedly transmitted in the multiple bandwidth parts (BWPs), the UE may receive the positioning reference signal (PRS) via the multiple bandwidth parts (BWPs), raising detection accuracy.

For example, for positioning the UE, the UE may receive a positioning reference signal from each of the serving cell and at least two or more neighboring cells. The UE may measure reference signal time difference information between the received reference signals. The UE may transmit RSTD information for the positioning reference signals to the base station. The base station may estimate the crossing area based on the RSTD information. Thus, the UE's position may be estimated.

According to the embodiments described above, it is possible to provide a reporting resolution for a positioning reference signal suitable for various use scenarios required in NR by flexibly configuring numerology for the radio resource used in transmission of the positioning reference signal, per time interval or per bandwidth part, in performing positioning in a next-generation wireless network. It is possible to provide an appropriate reporting resolution according to the UE's circumstance by differently configuring numerology for the radio resource used in transmission of a positioning reference signal based on the UE's capability in performing positioning in a next-generation wireless network. Thus, direct positioning reference signal (PRS) transmission control considering the resolution of the positioning reference signal (PRS) may be rendered possible.

Figure 15:
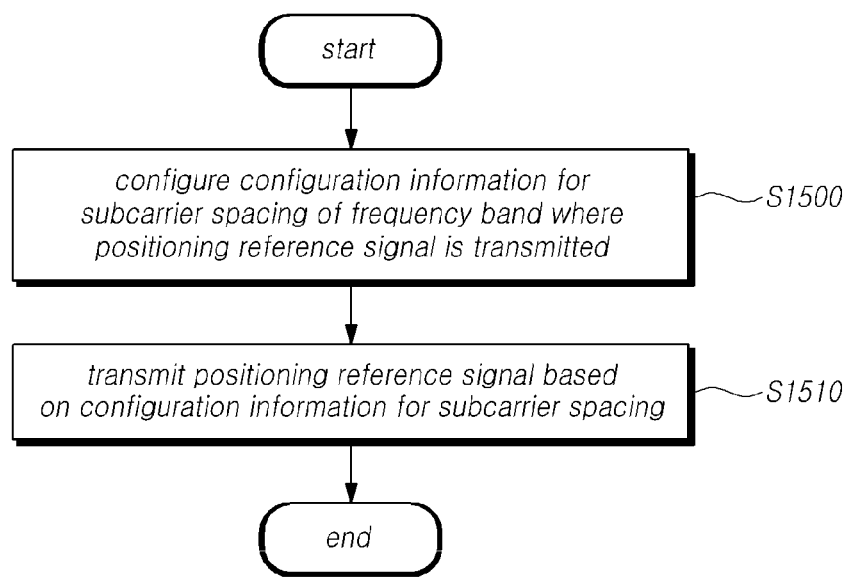
FIG. 15 is a flowchart illustrating a procedure of a base station for performing positioning according to an embodiment.

FIG. 15 is a flowchart illustrating a procedure of a base station for performing positioning according to an embodiment.

Referring to FIG. 15, the base station may configure configuration information for a subcarrier spacing of the frequency band where a positioning reference signal (PRS) is transmitted (S1500).

For example, the base station may configure the positioning reference signal (PRS) based on various numerologies to support different resolutions in relation to transmission of the positioning reference signal (PRS) for positioning of the UE. NR provides a total of five subcarrier spacings corresponding to 15 kHz, 30 kHz, 60 kHz, 120 kHz, and 240 kHz.

In NR, one subframe may be typically configured of 1 ms, and one slot may be configured of 14 symbols. For example, where the subcarrier spacing is 15 KHz, one subframe is configured of one slot and may thus be made up of 14 symbols. If the subcarrier spacing is 30 KHz, one subframe is configured of two slots and may thus be made up of 28 symbols.

In this case, as described above, in the subcarrier spacing (SCS) of 15 kHz, one sample may have a resolution value of about 9.8m. The number of time samples for each single OFDM symbol may be set to the same number for each subcarrier spacing. Thus, where the subcarrier spacing is 30 kHz, the time per OFDM symbol is reduced in half, so that a resolution of about 9.8/2=4.9m may be supported for each single sample.

Likewise, when the subcarrier spacing is 60 kHz, a resolution of about 9.8/22m may be supported per single sample and, when the subcarrier spacing is 120 kHz, a resolution of about 9.8/23m may be supported per single sample. That is, the larger subcarrier spacing value the numerology has, the smaller resolution value one time sample of positioning reference signal (PRS) provides. Thus, the resolution of positioning may increase.

According to an embodiment, the base station may configure the numerology of the frequency band where the positioning reference signal (PRS) is transmitted based on the resolution of the positioning reference signal (PRS) required per use case. As an example, the base station may transmit the configuration information for the subcarrier spacing for transmission of the positioning reference signal (PRS) via higher layer signaling. As another example, the base station may transmit the configuration information for the subcarrier spacing for transmission of the positioning reference signal (PRS) via a downlink control channel or downlink data channel.

In NR, two subcarrier spacings with respect to a transmission frequency of 6 GHz are used for transmission of data or a reference signal (RS). Selection of two subcarrier spacings may be performed with respect to the transmission frequency of 6 GHz for the positioning reference signal (PRS).

For example, where the transmission frequency is less than 6 GHz, the base station may set the subcarrier spacing to 15 kHz or 30 kHz. At this time, the case where the subcarrier spacing is 15 kHz may be selected when a relatively low resolution is required for the positioning reference signal (PRS). The case where the subcarrier spacing is 30 kHz may be selected when a relatively high resolution is required for the positioning reference signal (PRS).

Likewise, where the transmission frequency is not less than 6 GHz, the base station may set the subcarrier spacing to 60 kHz or 120 kHz. At this time, the case where the subcarrier spacing is 60 kHz may be selected when a relatively low resolution is required for the positioning reference signal (PRS). The case where the subcarrier spacing is 120 kHz may be selected when a relatively high resolution is required for the positioning reference signal (PRS).

According to an embodiment, where the UE simultaneously supports a band not more than 6 GHz and an mmWave band which is not less than 6 GHz, the base station may integrate all the numerologies for the corresponding UE and apply an appropriate resolution per use case. That is, in the case where the transmission frequency is less than 6 GHz, if a first resolution is required, the base station may select the subcarrier spacing as 15 kHz. Where a second resolution higher than the first resolution is required, the base station may select the subcarrier spacing as 30 Hz. In the case where the transmission frequency is 6 GHz or more, if a third resolution is required, the base station may select the subcarrier spacing as 60 kHz. Where a fourth resolution is required, the base station may select the subcarrier spacing as 120 kHz.

According to an embodiment, upon transmission of the positioning reference signal (PRS), the base station may configure a different numerology per transmission interval according to each use case, with respect to the single bandwidth part (BWP). For example, the base station may perform configuration of different numerologies and transmission of the positioning reference signal (PRS) based on TDM may be rendered possible. That is, in the same bandwidth part among a plurality of bandwidth parts constituting the system bandwidth, a positioning reference signal (PRS) transmission interval with a different resolution per time interval may be configured. In this case, numerology information and time interval information may be added to the positioning reference signal (PRS) configuration information.

Thus, the base station may transmit positioning reference signals (PRS) with different resolutions in different time intervals even in the single bandwidth part (BWP). At this time, adjustment of different resolutions may be achieved via numerology, as described above, under the assumption that the positioning reference signal (PRS) patterns are the same.

According to another embodiment, where the positioning reference signal (PRS) is transmitted based on multiple bandwidth parts (BWPs), the base station may configure a different numerology per bandwidth part (BWP) depending on the use case. Multiple BWP simultaneous transmission-based different numerologies may be configured and, thus, the positioning reference signal (PRS) may be transmitted.

As an example, the base station may transmit the positioning reference signal (PRS) simultaneously in all the bandwidth parts (BWPs). For example, in a first bandwidth part, the positioning reference signal (PRS) may be transmitted, with the subcarrier spacing set to 120 kHz. In a second bandwidth part, the positioning reference signal (PRS) may be transmitted, with the subcarrier spacing set to 15 kHz. Likewise, the positioning reference signal (PRS) may be transmitted, with the subcarrier spacing set to 30 kHz in a third bandwidth part and the subcarrier spacing set to 60 kHz in a fourth bandwidth.

That is, the base station may configure and transmit the positioning reference signal (PRS) based on a different numerology per bandwidth part (BWP). By so doing, positioning reference signals (PRSs) satisfying various resolution requirements may be simultaneously transmitted.

In this case, since configuration information may be received via each bandwidth part (BWP) for the positioning reference signal (PRS), no separate higher layer configuration information for transmission of the positioning reference signal (PRS) may be required. However, even in this case, bandwidth part (BWP) index and numerology value, other than the existing positioning reference signal (PRS) configuration information, may be included.

However, this is merely an example, and embodiments of the disclosure are not limited thereto. For example, the base station may configure and transmit the positioning reference signal (PRS) based on different numerologies according to the UE's capability and use cases for some of the plurality of bandwidth parts (BWPs) constituting the system bandwidth.

For example, the base station may transmit the positioning reference signal (PRS) based on the numerology satisfying several resolution requirements considering the capability of each UE. The base station may perform simultaneous transmission by simultaneously repeating positioning reference signals (PRSs), which have the same resolution requirement, on several bandwidth parts (BWPs).

Referring back to FIG. 15, the base station may transmit the positioning reference signal based on the configuration information for subcarrier spacing (S1510).

The base station may transmit the positioning reference signal to the UE based on the configuration information for the subcarrier spacing. For example, the base station may further transmit the configuration information for the transmission bandwidth for the positioning reference signal to the UE and may transmit the positioning reference signal based on the configuration information. For example, it is assumed that, for each UE, PDSCH reception is performed via any activated bandwidth part (BWP). In this case, each UE may activate a specific bandwidth part (BWP) configured to transmit the positioning reference signal for UE positioning and receive the positioning reference signal.

According to an embodiment, where multiple bandwidth parts (BWP) are configured, each UE may activate multiple specific bandwidth parts (BWPs) configured to transmit the positioning reference signal for UE positioning and receive the positioning reference signal. In this case, in a specific bandwidth, the UE may receive the positioning reference signal in the radio resource allocated to transmission of the positioning reference signal based on the configuration information for the positioning reference signal transmission pattern.

The NR UE may detect the positioning reference signal (PRS) based on the UE's capability. For example, the positioning reference signal (PRS) may be detected based on the UE's capability. Whether the UE receives the multiple bandwidth parts (BWPs) for reception of the positioning reference signal (PRS), the UE's positioning reference signal (PRS) processing time, and reporting capability may be considered as the UE's capability.

According to an embodiment, it is assumed that the UE may support the function of receiving multiple bandwidth parts (BWPs) as well as receiving a single bandwidth part (BWP). Also assumed is that there may be mixed UEs supporting only UE bandwidth part (BWP) and UEs supporting multiple bandwidth parts (BWPs) as well, depending on the UE's capability.

The UE which supports single bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As an example, the UE which supports multiple bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As another example, the UE may receive the positioning reference signal (PRS) in all the bandwidth parts (BWPs) supported in the positioning reference signal (PRS) configuration information. That is, regardless of the use cases for the UE itself, the UE may perform detection on the bandwidth parts (BWPs) where all the positioning reference signals (PRSs) are transmitted. If the structure is such that the same numerology-based positioning reference signal (PRS) is repeatedly transmitted in the multiple bandwidth parts (BWPs), the UE may receive the positioning reference signal (PRS) via the multiple bandwidth parts (BWPs), raising detection accuracy.

According to an embodiment, for positioning the UE, the UE may receive a positioning reference signal from each of the serving cell and at least two or more neighboring cells. The UE may measure reference signal time difference information between the received reference signals. The UE may transmit RSTD information for the positioning reference signals to the base station. The base station may estimate the crossing area based on the RSTD information. Thus, the UE's position may be estimated.

According to the embodiments described above, it is possible to provide a reporting resolution for a positioning reference signal suitable for various use scenarios required in NR by flexibly configuring numerology for the radio resource used in transmission of the positioning reference signal, per time interval or per bandwidth part, in performing positioning in a next-generation wireless network. It is possible to provide an appropriate reporting resolution according to the UE's circumstance by differently configuring numerology for the radio resource used in transmission of a positioning reference signal based on the UE's capability in performing positioning in a next-generation wireless network. Thus, direct positioning reference signal (PRS) transmission control considering the resolution of the positioning reference signal (PRS) may be rendered possible.

Hereinafter, each embodiment of configuring the transmission numerology of a positioning reference signal (PRS) considering resolution requirements per use case and multiple numerologies in NR will be described in detail with reference to the relevant drawings.

A use case that is mainly introduced in association with the NR positioning basically refers to positioning use case and accuracy in TR 22.862. This is summarized in Table 9 below.

TABLE 9

SMARTER Use Cases and Potential Positioning Requirements

| Use case | Accuracy |
|---|---|
| Higher accuracy positioning outdoor with high speed moving | <1 m Up to 200 km/h |
| Higher accuracy positioning with low speed moving (including indoor and outdoor) | <1 m Indoor and Outdoor |
| Higher accuracy positioning for low altitude UAV in critical condition (e.g. Drones) | Remote control (Outdoor): 0.5 m Horizontal 0.3 m Vertical Data analysis (Outdoor): 0.1 m Horizontal 0.1 m Vertical |
| Higher accuracy positioning for mIoT | Wearables (Outdoor/Indoor): 2 m Horizontal Patient location (in Hospital): 3 m Horizontal Patient location (out Hospital): 200 m Horizontal |

Summarizing NR requirements, higher resolution than that of LTE should be provided and also various use cases should be supported. Further, the bandwidth part (BWP) newly introduced in NR should be further considered. In NR, the full transmission bandwidth of a single carrier may be split into up to four BWPs, and an indication of the BWPs is dynamically performed via DCI (up to 2-bit field).

In addition to the method of operating the bandwidth part (BWP) and various positioning reference signal (PRS) use cases described above, numerology and the UE's capability are considered. Based thereupon, specific embodiments for a numerology-based resolution supporting method and a positioning reference signal (PRS) operation method considering the UE's capability are described below in detail.

Hereinafter, configuration of a transmission pattern of a positioning reference signal (PRS) for applying the numerology-based resolution supporting method and the positioning reference signal (PRS) operation method considering the UE's capability according to the embodiments will be described first.

According to an embodiment, a mapping of a positioning reference signal (PRS) pattern in the time-frequency domain may be set as a mapping of the positioning reference signal (PRS) itself or positioning reference signal (PRS) higher layer signaling and channel state information reference signal (CSI-RS) resource mapping.

In the case of the positioning reference signal (PRS)'s own mapping, the positioning reference signal (PRS) itself may be newly added to a physical signal in the same manner as typical. That is, upon time-frequency mapping of the positioning reference signal (PRS), a frequency domain shift pattern may be implicitly defined based on cell ID information. According to such a mapping of the cell ID-based positioning reference signal (PRS) pattern, the UE may be precisely aware of the positioning reference signal (PRS) patterns of the neighboring cells, so that detection of per-cell positioning reference signal (PRS) is possible, and per-cell interference control may be facilitated.

In the case of channel state information reference signal (CSI-RS) resource mapping, the positioning reference signal (PRS) exists only in the higher layer signaling configuration, and the actual positioning reference signal (PRS) is transmitted as a physical signal via the CSI-RS resource. In this case, the NR CSI-RS may be utilized because the NR CSI-RS allows for the most flexible mapping and generation of a desired positioning reference signal (PRS) pattern. However, since the CSI-RS configuration information is basically UE-specific, it may differ per UE and per cell. Thus, for the UE to be aware of the positioning reference signal (PRS) patterns of all the cells, a default CSI-RS mapping pattern may be defined, and per-cell shift patterns may be performed by adding separate signaling.

The shift pattern of CSI-RS per cell may be configured based on the cell ID, and a shift pattern for each cell may be directly defined.

Further, in the case of the above-described positioning reference signal (PRS) itself mapping and channel state information reference signal (CSI-RS) resource mapping, a PRS pattern shift field may be added. For example, if configured with on/off 1 bit field, cell ID information may be used when the PRS-pattern-shift is 'on' and a directly configured value may be used when the PRS-pattern-shift is 'off.'

Hereinafter, a positioning reference signal (PRS) itself mapping method according to an embodiment will be described. A positioning reference signal (PRS) supporting a flexible pattern may be adopted to support various use cases required in NR.

To that end, for example, the base station may configure the positioning reference signal pattern suitable for the UE use case via high layer signaling. This may mean that various positioning reference signal patterns are directly selected by the network and indicated to the UE.

According to an example, the positioning reference signal configuration-related information provided to the UE may include information, such as positioning reference signal transmission bandwidth, positioning reference signal (PRS) configuration index, number of consecutive positioning reference signal subframes, and positioning reference signal (PRS) muting pattern. The positioning reference signal configuration index may provide the positioning reference signal transmission period and shielding film offset information as shown in Table 10 below.

TABLE 10

Positioning reference signal subframe configuration

| PRS configuration index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS} - 160$ |
| 480-1119 | 640 | $I_{PRS} - 480$ |
| 1120-2399 | 1280 | $I_{PRS} - 1120$ |
| 2400-2404 | 5 | $I_{PRS} - 2400$ |
| 2405-2414 | 10 | $I_{PRS} - 2405$ |
| 2415-2434 | 20 | $I_{PRS} - 2415$ |
| 2435-2474 | 40 | $I_{PRS} - 2435$ |
| 2475-2554 | 80 | $I_{PRS} - 2475$ |
| 2555-4095 | | Reserved |

In contrast to the typical art in which only a predefined single pattern is used in all the cells as the default pattern of positioning reference signal, various pieces of pattern information of positioning reference signal dependent upon various use cases need to be newly added in NR. For example, in the positioning reference signal pattern information, the following information may be directly and newly included, or be included in the form of a positioning reference signal (PRS) pattern configuration index.

Positioning reference signal (PRS) pattern index: may indicate information to define the positioning reference signal pattern's own pattern. For example, the increasing pattern/fixed pattern of subcarrier index of the positioning reference signal RE may be defined depending on the OFDM symbol. However, without limitations thereto, various irregular patterns may be defined.

PRS density in frequency domain: In the LTE positioning reference signal, the positioning reference signal density ($\rho$) is set to 2 REs/symbol/PRB as shown in FIG. 12. However, according to the disclosure, the positioning reference signal density may be defined as various values 1/2/3/4/ . . . /12, as well as p=2.

PRS location in time domain: In the typical LTE positioning reference signal, the OFDM symbol position where the reference signal is transmitted is fixed in the LTE normal CP case as shown in FIG. 12. However, according to the disclosure, the transmission position of the positioning reference signal may be freely determined by the base station. For example, in the NR 14-symbol slot, up to 14 OFDM symbols may be selected to transmit the positioning reference signal. Thus, the corresponding field may be defined with, e.g., PRS location in time domain or PRS_mapping-_time information and may be expressed as 14-bit information, such as $[l_0, l_1, l_2, l_3, \ldots l_{13}]$. For example, if this information is set to [00111111111111], the positioning reference signal may be transmitted in the OFDM symbols in the entire NR slot except for the first two OFDM symbols. The information means being newly transmitted in N bits, and the above-described definition of 14 bits is an example.

Positioning reference signal (PRS) starting point in frequency domain: it may be the starting position of the positioning reference signal RE in the disclosure. In the LTE positioning reference signal, the starting point in frequency domain of the positioning reference signal RE is implicitly determined by the physical cell ID (PCID). Thus, there is a procedure in which if its own serving cell PCID is obtained, the positioning reference signal pattern is automatically recognized by the UE. However, in the NR positioning reference signal, such starting point in frequency domain or frequency domain offset may be directly indicated to support a more flexible positioning reference signal structure. The value of the information may have an NR PCID or may be determined within a specific range. For example, in NR, the PCID has a range of 0, 1, 2, . . . , and 1007 (1008 count). Thus, a PCID within the range may be arbitrarily designated and be transmitted to the UE, or a range may be determined considering the maximum neighbor cell list range. For example, in LTE, for up to 24 cells, a neighboring cell list is transferred to the UE via positioning reference signal configuration information. Or, the positioning reference signal starting point may be determined based on the frequency reuse factor. For example, if the number of positioning reference signal REs per OFDM symbol is two, the frequency reuse factor becomes 6. That is, since there are up to six orthogonal allocation patterns, the frequency domain offset information may be transferred via less, 6-bit information.

Positioning reference signal (PRS) starting point in time domain: it may be the information indicating the starting OFDM symbol position where the positioning reference signal is transmitted. Where the above-described information of positioning reference signal (PRS) location in time domain is absent, the information of starting position in time domain may be further needed. The range of the information may be determined from among (0, 1, to 13) based on the 14 OFDM slot.

Figure 16:
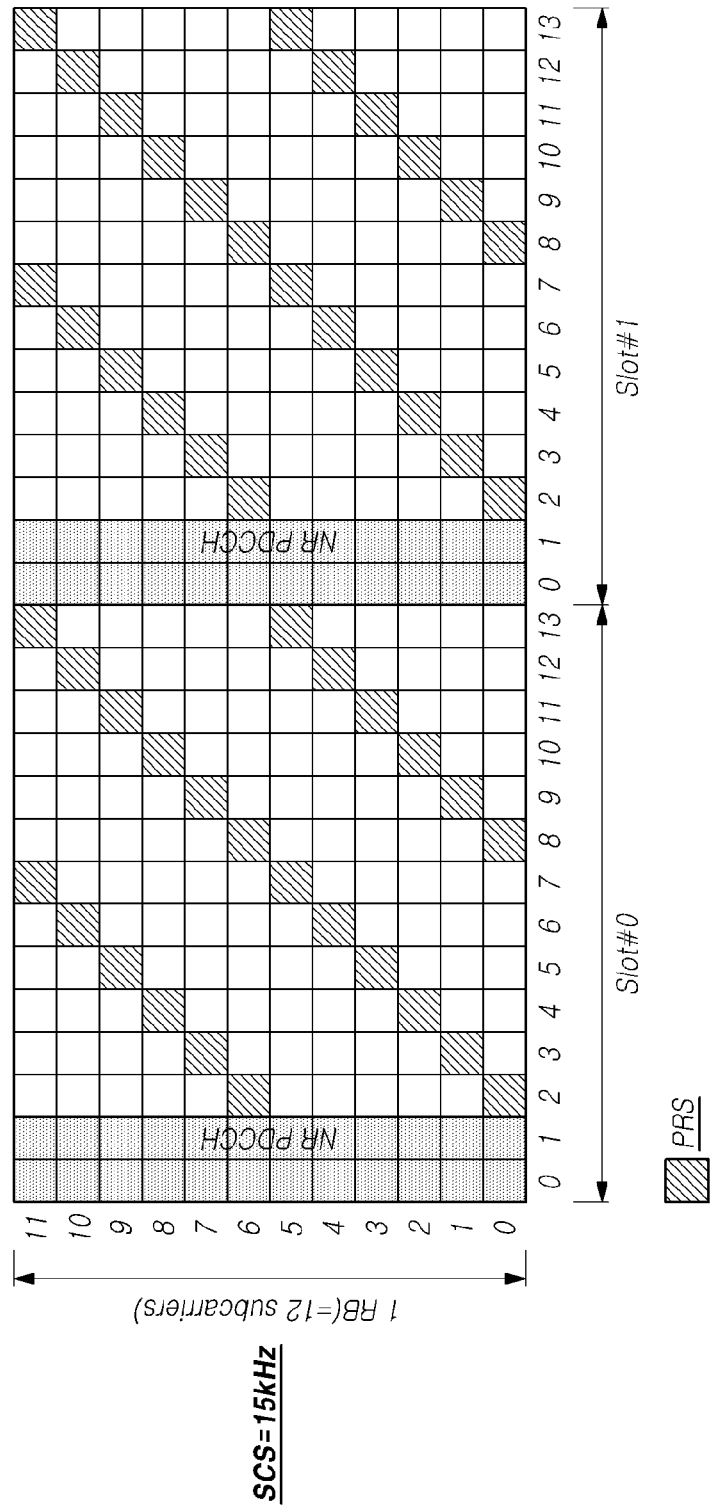
FIGS. 16, 17, 18, and 19 are diagrams for describing a positioning reference signal transmitted according to different numerologies according to an embodiment.
Figure 17:
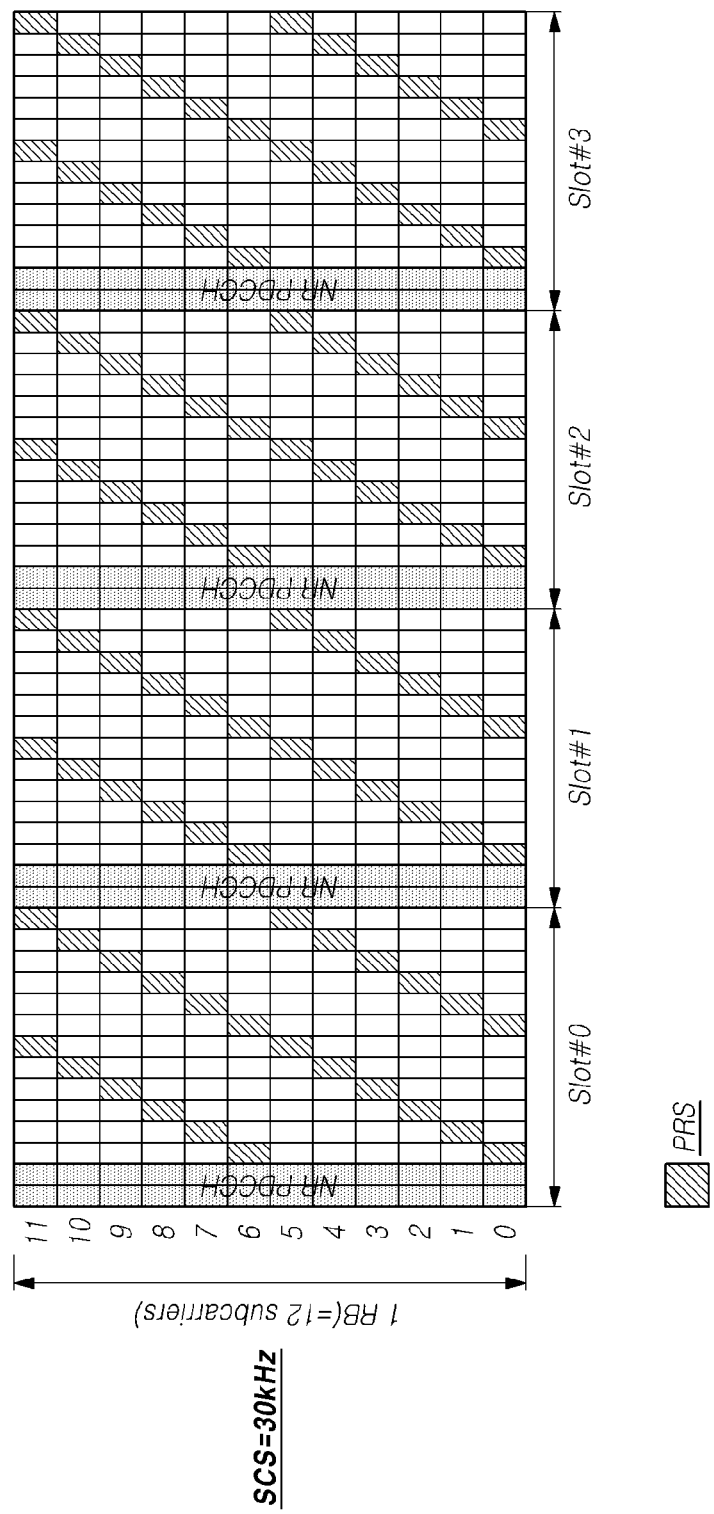

According to an embodiment, the positioning reference signal (PRS) configuration pattern defined using the above-described NR positioning reference signal configuration information may be set to a pattern of ramping (SC index increase) as the OFDM symbol index increases. For example, FIGS. 16 and 17 illustrate a ramping pattern for the case where the positioning reference signal density (p) is 2 REs/symbol/PRS.

Figure 18:
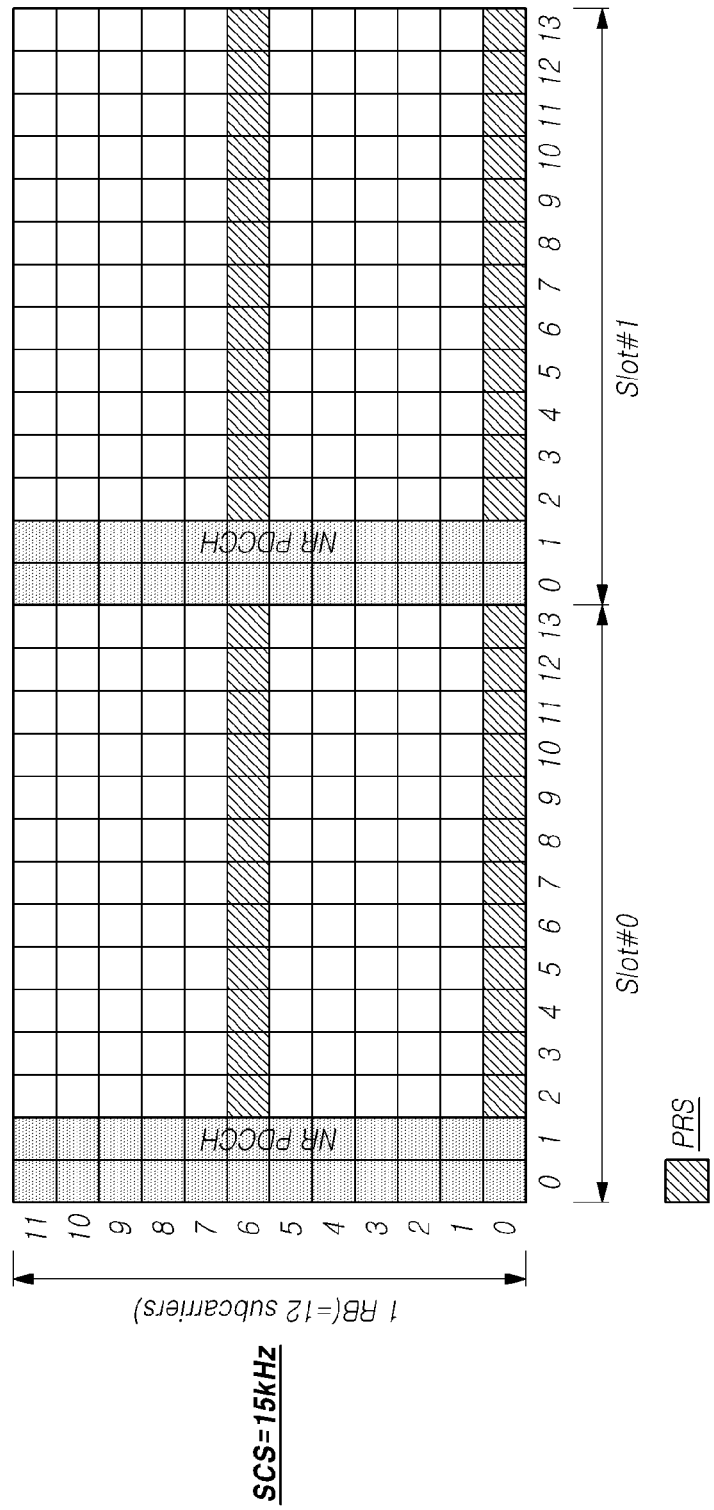
Figure 19:
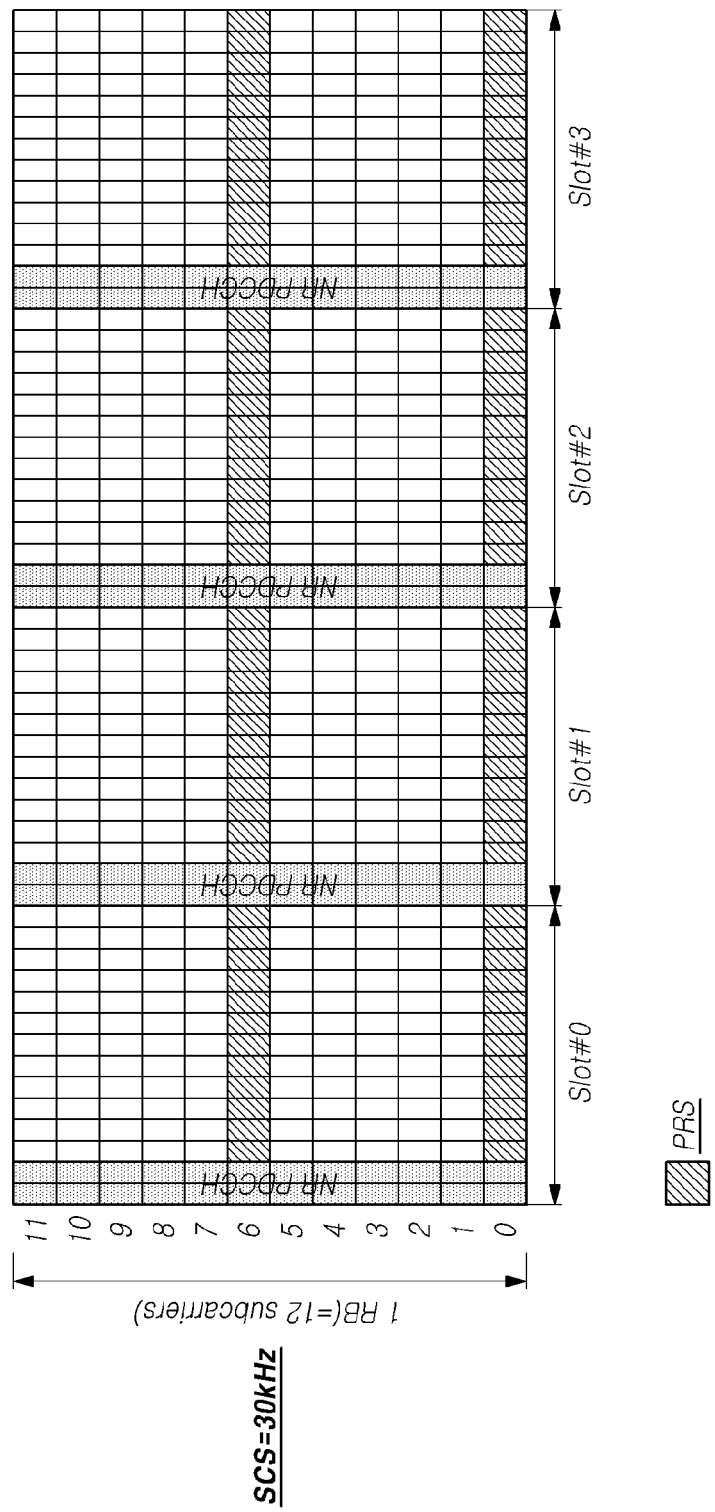

Or, according to an embodiment, the positioning reference signal configuration pattern may be set as a fixed pattern regardless of the OFDM symbol index. For example, FIGS. 18 and 19 illustrate a fixed pattern for the case where the positioning reference signal density (p) is 2 REs/symbol/PRS.

Hereinafter, a channel state information reference signal (CSI-RS) resource mapping method according to another embodiment will be described. A multiple CSI-RS resource configuration may be used for a flexible positioning reference signal pattern configuration.

In this case, in the positioning reference signal pattern configuration, the corresponding is transmitted to the UE via high layer signaling, but the actual positioning reference signal may be transmitted using the CSI-RS resource. Basically, the NR CSI-RS defines 1-symbol CSI-RS pattern as shown on the two upper cases, not shaded, in Table 11, and provides a category in which the CSI-RS RE density (p) may have a value of one or more.

According to an example, multiple NR CSI-RS resources may be configured for the purpose of transmitting a positioning reference signal. Unlike LTE, NR has no cell-specific reference signal RS. That is, all RSs have the nature of being UE-specific. Since among such RSs, the CSI-RS has the characteristic of flexible configuration, the case where the corresponding CSI-RS location table is shown in shading in Table 11 may be added to provide various densities of positioning reference signal, according to an example. In Table 11, the case where the CSI-RS RE density (p) shown in shading is 2, 4, 6, or 12 may be added as a new CSI-RS pattern. Such new CSI-RS pattern may add other category or be included in part of the table proposed, as necessary.

That is, in accordance with an embodiment of the present disclosure, an intended positioning reference signal pattern may be defined by allocating multiple (N) single symbol CSI-RS pattern-based CSI-RS resources.

TABLE 11

CSI-RS locations within a slot for proposed PRS definition

| Row | Ports | Density P | CDMType | $(\bar{k}, \bar{l})$ | k' | l' |
|---|---|---|---|---|---|---|
| 1 | 1 | 3 | No CDM | $(k_0, l_0), (k_0 + 4, l_0),$ $(k_0 + 8, l_0)$ | 0 | 0 |
| 2 | 1 | 1, 0.5 | No CDM | $(k_0, l_0)$ | 0 | 0 |
| X | 1 | 2 | No CDM | $(k_0, l_0), (k_0 + 6, l_0)$ | 0 | 0 |
| X | 1 | 4 | No CDM | $(k_0, l_0), (k_0 + 3, l_0),$ $(k_0 + 6, l_0), (k_0 + 9, l_0)$ | 0 | 0 |
| X | 1 | 6 | No CDM | $(k_0, l_0), (k_0 + 2, l_0),$ $(k_0 + 4, l_0), (k_0 + 6, l_0),$ $(k_0 + 8, l_0), (k_0 + 10, l_0),$ | 0 | 0 |
| X | 1 | 12 | No CDM | $(k_0, l_0), (k_0 + 1, l_0),$ $(k_0 + 2, l_0), \ldots,$ $(k_0 + 11, l_0)$ | 0 | 0 |

According to an embodiment, CSI-RS pattern configuration information may be directly configured for the CSI-RS resource. That is, a mapping position may be set in each of the frequency domain and the time domain. Position allocation information may be provided in the higher-layer parameter CSI-RS-ResourceMapping of RRC signaling for the actual NR CSI-RS configuration. N CSI-RS resources having such a flexible CSI-RS allocation characteristic may be included, and the intended positioning reference signal pattern may be defined.

For example, upon configuring a positioning reference signal in slot, the starting positions of N single symbol CSI-RS resources may be set to be the same. In this case, it is assumed that one CSI-RS resource set is defined in the NR slot, with a total 12 CSI-RS resources configured therein. According to an embodiment, the same RE mapping may be configured for all the CSI-RS resources in the slot.

According to another embodiment, upon configuring the positioning reference signal in slot, the starting positions of N single symbol CSI-RS resources may be same in part or be set to differ from each other. In this case, it is assumed that one CSI-RS resource set is defined in the NR slot, with a total 12 CSI-RS resources configured therein. For example, different RE mappings (ramping case) may be configured for all the CSI-RS resources in the slot.

According to a first embodiment of the disclosure, the positioning reference signal (PRS) may be transmitted based on numerology to be able to support different resolutions.

According to an embodiment of the disclosure, the positioning reference signal (PRS) may be transmitted based on various numerologies to support different resolutions in relation to transmission of the positioning reference signal (PRS) for positioning of the UE. As described above, in the subcarrier spacing (SCS) of 15 kHz, one sample may have a resolution value of about 9.8m. NR provides a total of five subcarrier spacings. In this case, the resolution for each single sample which may be provided per numerology is shown in Table 12.

TABLE 12

| Supported transmission numerologies | | | |
|---|---|---|---|
| $\mu$ | $\Delta f = 2^\mu \cdot 15 [kHz]$ | Cyclic prefix | PRS resolution per time sample (m) |
| 0 | 15 | Normal | 9.8 |
| 1 | 30 | Normal | 9.8/2 |
| 2 | 60 | Normal, Extended | $9.8/2^2$ |
| 3 | 120 | Normal | $9.8/2^3$ |
| 4 | 240 | Normal | $9.8/2^4$ |

As shown in Table 12, the larger subcarrier spacing value the numerology has, the smaller resolution value one time sample of positioning reference signal (PRS) provides. Thus, the resolution of positioning may increase. For example, FIGS. 16 and 17 illustrate an example of positioning reference signal (PRS) transmission pattern when the subcarrier spacing is 15 kHz and 30 kHz, respectively.

In NR, one subframe may be typically configured of 1 ms, and one slot may be made up of 14 symbols. Where the subcarrier spacing is 15 KHz, one subframe may be configured of one slot and may thus be made up of 14 symbols. Where the subcarrier spacing is 30 KHz, one subframe may be configured of two slots and may thus be made up of 28 symbols.

Thus, as shown in FIGS. 16 and 17, comparison between when the subcarrier spacing is 15 KHz and when the subcarrier spacing is 30 KHz reveals that the numerology when the subcarrier spacing is 30 KHz in the same time interval is transmitted in a shorter period. That is, the per-OFDM symbol time is reduced in half. Further, the same number of time samples per single OFDM symbol is set. Thus, as compared with when the subcarrier spacing supporting the resolution of 9.8m per single sample is 15 kHz, the resolution of about 9.8/2=4.9m per single sample may be supported when the subcarrier spacing is 30 KHz.

The base station may set the numerology value based on the resolution of the positioning reference signal (PRS) required per user case, in determining the numerology of the bandwidth part (BWP) where the positioning reference signal (PRS) is transmitted.

In NR, two subcarrier spacings with respect to a transmission frequency of 6 GHz are used for transmission of data or a reference signal (RS). The set value may be known as the one-bit field of PBCH is received by the UE. Thus, selection of the following two subcarrier spacings may be performed for the positioning reference signal (PRS) with respect to the transmission frequency of 6 GHz.

Case 1: fc<6 GHz
SCS-1: 15 kHz
SCS-2: 30 kHz
Case 2: fc>=6 GHz
SCS-1: 60 kHz
SCS-2: 120 kHz Thus, the resolutions for the positioning reference signal (PRS) may be divided into the following use cases with respect to each center frequency.

Case 1: fc<6 GHz
SCS-1: 15 kHz=>Low resolution
SCS-2: 30 kHz=>High resolution
Case 2: fc>=6 GHz
SCS-1: 60 kHz=>Low resolution
SCS-2: 120 kHz=>High resolution According to an example, if the UE may simultaneously use a band not more than 6 GHz and an mmWave band which is not less than 6 GHz, the UE may integrate all the numerologies and apply a resolution per use case.

Case 1: fc<6 GHz
SCS-1: 15 kHz=>$1^{st}$-step resolution
SCS-2: 30 kHz=>$2^{nd}$-step resolution
Case 2: fc>=6 GHz
SCS-1: 60 kHz=>$3^{rd}$-step resolution
SCS-2: 120 kHz=>$4^{th}$-step resolution According to an embodiment, upon transmission of the positioning reference signal (PRS), the base station may divide per-use case transmission intervals with respect to the single bandwidth part (BWP) and configure a different numerology per transmission interval. Hereinafter, a method of configuring a positioning reference signal (PRS) considering each bandwidth part (BWP) will be described.

According to an embodiment, for the configuration of the positioning reference signal (PRS) in NR, the legacy LTE positioning reference signal (PRS) configuration information may be adopted as it is, and the BWP index information indicating the bandwidth part (BWP) where the positioning reference signal (PRS) is transmitted may be included. In this case, although data transmission is still possible in other BWPs according to an example, the positioning reference signal (PRS) may be transmitted only in the PRS-BWP between multiple cells configured for transmission of the positioning reference signal (PRS).

Figure 20:
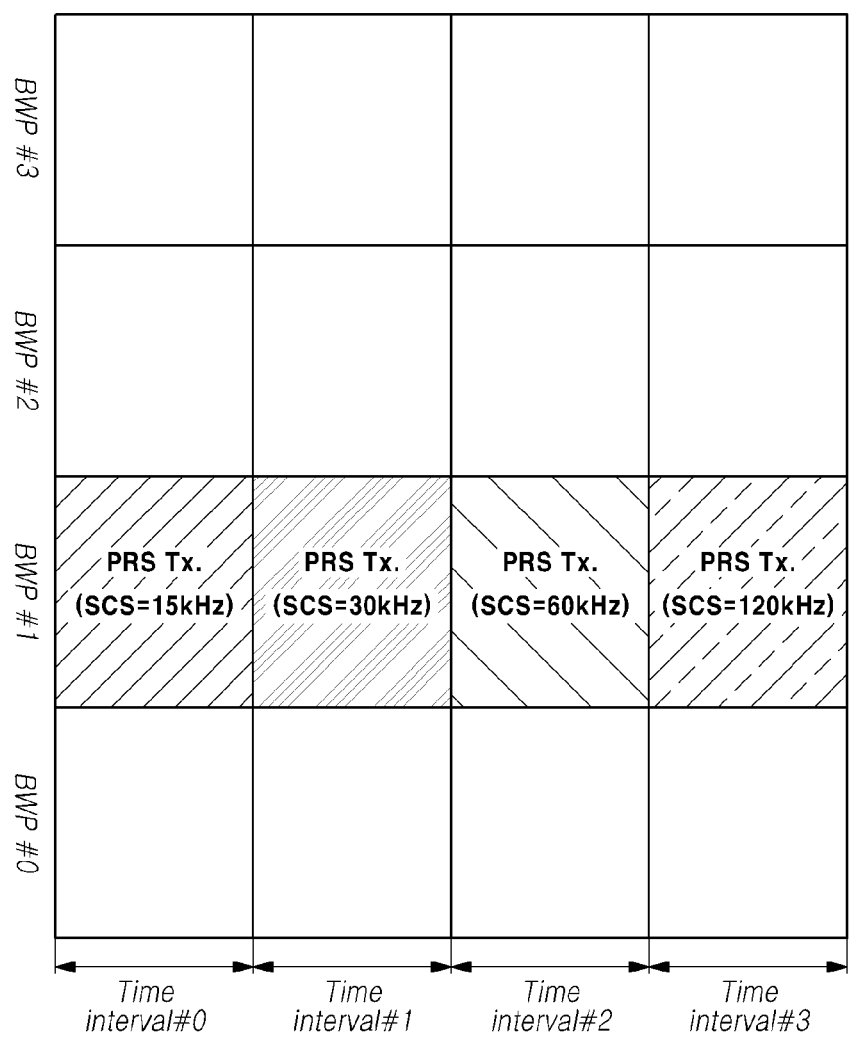
FIG. 20 is a diagram for describing configuring numerology per time interval when a positioning reference signal is transmitted according to an embodiment.

FIG. 20 illustrates configuration of a different numerology and transmission of a positioning reference signal (PRS) based on TDM. Referring to FIG. 20, positioning reference signal (PRS) transmission intervals which have different resolutions for time intervals #0 to #3 may be configured in the same bandwidth part BWP #1. That is, since NR Rel-15 UE is able to only receive a single BWP, it is necessary to support such TDM-based positioning reference signal (PRS) transmission.

In this case, as described above, it requires to add numerology information and time interval information to the positioning reference signal (PRS) configuration information. FIG. 21 illustrates configuration information (PRS_info) for a positioning reference signal including bandwidth part index information and numerology information. The positioning reference signal configuration information (PRS_info) may provide information related to the configuration of the positioning reference signal.

According to an embodiment, where a numerology value for multiple time intervals needs to be configured, a plurality of set values may be required to be included for the transmission interval for each prs-Numerology. Thus, positioning reference signals (PRS) with different resolutions may be transmitted in different time intervals even in the single bandwidth part (BWP). At this time, adjustment of different resolutions may be achieved via numerology, as described above, under the assumption that the positioning reference signal (PRS) patterns are the same.

Figure 22:
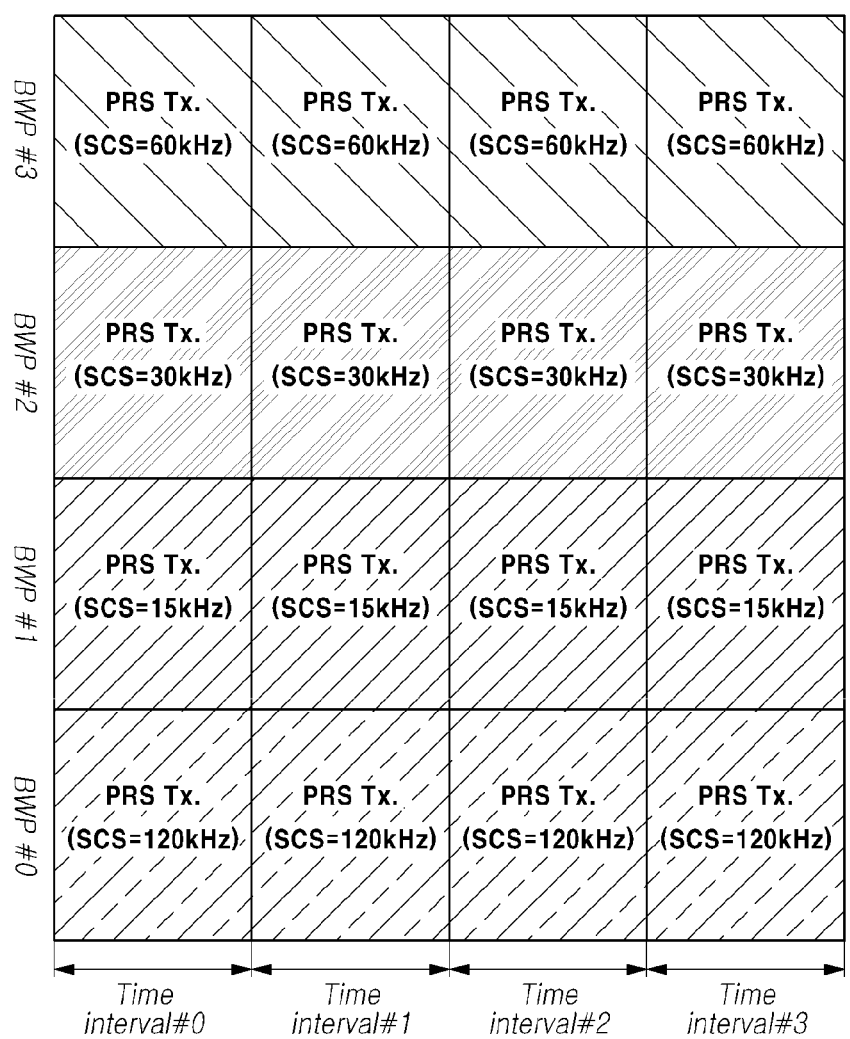
FIG. 22 is a diagram for describing configuring numerology per bandwidth part where a positioning reference signal is transmitted according to an embodiment.

According to another embodiment, where the positioning reference signal (PRS) is transmitted based on multiple bandwidth parts (BWPs), a different numerology may be configured per bandwidth part (BWP) depending on the use case. FIG. 22 illustrates configuration of a different numerology and transmission of a positioning reference signal (PRS) based on multiple bandwidth part (BWP) simultaneous transmission.

For example, it is assumed that the positioning reference signal (PRS) is transmitted simultaneously in all the bandwidth parts (BWPs) as shown in FIG. 22. Referring to FIG. 22, in the bandwidth part BWP #0, the positioning reference signal (PRS) may be transmitted, with the subcarrier spacing set to 120 kHz. Likewise, in the bandwidth part BWP #1, the positioning reference signal (PRS) may be transmitted, with the subcarrier spacing set to 15 kHz. Likewise, in the bandwidth part BWP #2, the positioning reference signal (PRS) may be transmitted, with the subcarrier spacing set to 30 kHz. Likewise, in the bandwidth part BWP #3, the positioning reference signal (PRS) may be transmitted, with the subcarrier spacing set to 60 kHz. That is, the base station may configure and transmit the positioning reference signal (PRS) based on a different numerology per bandwidth part (BWP). By so doing, positioning reference signals (PRSs) satisfying various resolution requirements may be simultaneously transmitted.

In this case, since configuration information may be received via each bandwidth part (BWP) for the positioning reference signal (PRS), no separate higher layer configuration information for transmission of the positioning reference signal (PRS) may be required. However, like in the above-described embodiment, bandwidth part (BWP) index and numerology value, other than the existing positioning reference signal (PRS) configuration information, may be included.

According to an example, the base station may transmit the positioning reference signal (PRS) based on the numerology satisfying several resolution requirements considering the capability of each UE. The base station may perform simultaneous transmission by simultaneously repeating positioning reference signals (PRSs), which have the same resolution requirement, on several bandwidth parts (BWPs).

According to a second embodiment of the disclosure, the NR UE may detect the positioning reference signal (PRS) based on the UE's capability. For example, the operation of detecting the positioning reference signal (PRS) based on the UE's capability is assumed. Whether the UE receives the multiple bandwidth parts (BWPs) for reception of the positioning reference signal (PRS), the UE's positioning reference signal (PRS) processing time, and reporting capability may be included as the UE's capability that may be considered to receive the positioning reference signal (PRS).

Further, the number of positioning reference signal (PRS) ports may further be considered as the UE's capability. In general, however, the positioning reference signal may be transmitted using a single port.

According to an embodiment, it is assumed that the UE may support the function of receiving multiple bandwidth parts (BWPs) as well as receiving a single bandwidth part (BWP). Also assumed is that there may be mixed UEs supporting only UE bandwidth part (BWP) and UEs supporting multiple bandwidth parts (BWPs) as well, depending on the UE's capability.

For example, in a first case, the UE which supports single bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

For example, where the UE is able to support only a single bandwidth part (BWP), the UE may receive the positioning reference signal (PRS) using the bandwidth part (BWP #1) among the bandwidth parts shown in FIG. 22.

In a second case, the UE which supports multiple bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

For example, where a high resolution is required at a transmission frequency not less than 6 GHz in the current use case of the UE, the UE may receive the positioning reference signal (PRS) using the bandwidth part (BWP #0) among the bandwidth parts shown in FIG. 22.

As another example for the second case, the UE may receive the positioning reference signal (PRS) in all the bandwidth parts (BWPs) supported in the positioning reference signal (PRS) configuration information. For example, the UE may receive the positioning reference signal (PRS) for all of the four bandwidth parts shown in FIG. 22.

That is, regardless of the use cases for the UE itself, the UE may perform detection on the bandwidth parts (BWPs) where all the positioning reference signals (PRSs) are transmitted. If the structure is such that the same numerology-based positioning reference signal (PRS) is repeatedly transmitted in the multiple bandwidth parts (BWPs), the UE may receive the positioning reference signal (PRS) via the multiple bandwidth parts (BWPs), raising detection accuracy.

According to the embodiments described above, it is possible to provide a reporting resolution for a positioning reference signal suitable for various use scenarios required in NR by flexibly configuring numerology for the radio resource used in transmission of the positioning reference signal, per time interval or per bandwidth part, in performing positioning in a next-generation wireless network. It is also possible to provide an appropriate reporting resolution according to the UE's circumstance by differently configuring numerology for the radio resource used in transmission of a positioning reference signal based on the UE's capability in performing positioning in a next-generation wireless network. Thus, direct positioning reference signal (PRS) transmission control considering the resolution of the positioning reference signal (PRS) may be rendered possible.

Hereinafter, structural configurations of a UE and a base station which may perform all or some of the embodiments described above in connection with FIGS. 1 to 22 will be described with reference to the accompanying drawings.

Figure 23:
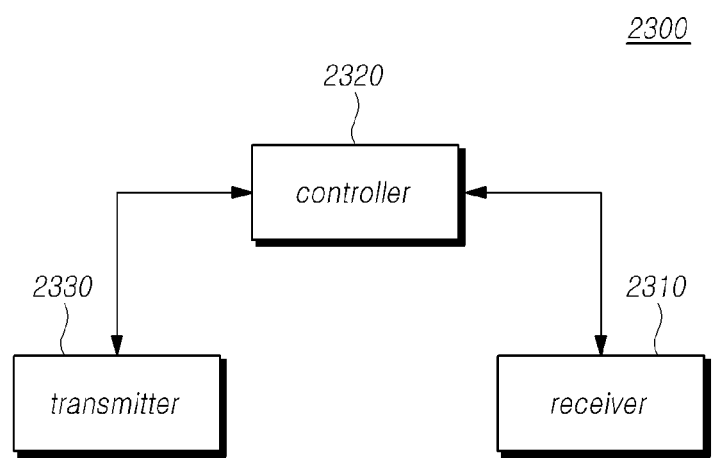
FIG. 23 is a block diagram illustrating a UE according to an embodiment.

FIG. 23 is a block diagram illustrating a UE 2300 according to an embodiment.

Referring to FIG. 23, according to the above-described first and second embodiments, the UE 2300 includes a receiver 2310, a controller 2320, and a transmitter 2330.

The receiver 2310 may receive configuration information for a subcarrier spacing of the frequency band where a positioning reference signal (PRS) is transmitted (S1400). The controller 2320 may identify the configuration information for the subcarrier spacing.

For example, the positioning reference signal (PRS) may be configured based on various numerologies to support different resolutions in relation to transmission of the positioning reference signal (PRS) for positioning of the UE. NR provides a total of five subcarrier spacings corresponding to 15 kHz, 30 kHz, 60 kHz, 120 kHz, and 240 kHz.

As described above, the larger subcarrier spacing value the numerology has, the smaller resolution value one time sample of positioning reference signal (PRS) provides. Thus, the resolution of positioning may increase.

According to an embodiment, the numerology of the frequency band where the positioning reference signal (PRS) is transmitted may be configured based on the resolution of the positioning reference signal (PRS) required per use case. As an example, the receiver 2310 may receive the configuration information for the subcarrier spacing for transmission of the positioning reference signal (PRS) via higher layer signaling. As another example, the receiver 2310 may receive the configuration information for the subcarrier spacing for transmission of the positioning reference signal (PRS) via a downlink control channel or downlink data channel.

In NR, two subcarrier spacings with respect to a transmission frequency of 6 GHz are used for transmission of data or a reference signal (RS). Selection of two subcarrier spacings may be performed with respect to the transmission frequency of 6 GHz for the positioning reference signal (PRS).

For example, where the transmission frequency is less than 6 GHz, the subcarrier spacing may be set to 15 kHz or 30 kHz. At this time, where a relatively low resolution is required for the positioning reference signal (PRS), the receiver 2310 may receive the positioning reference signal (PRS) according to a subcarrier spacing of 15 kHz. Where a relatively high resolution is required for the positioning reference signal (PRS), the receiver 2310 may receive the positioning reference signal (PRS) according to a subcarrier spacing of 30 kHz.

Likewise, where the transmission frequency is not less than 6 GHz, the subcarrier spacing may be set to 60 kHz or 120 kHz. At this time, where a relatively low resolution is required for the positioning reference signal (PRS), the receiver 2310 may receive the positioning reference signal (PRS) according to a subcarrier spacing of 60 kHz. Where a relatively high resolution is required for the positioning reference signal (PRS), the receiver 2310 may receive the positioning reference signal (PRS) according to a subcarrier spacing of 120 kHz.

For example, where the UE simultaneously supports a band not more than 6 GHz and an mmWave band which is not less than 6 GHz, the receiver 2310 may integrate all the numerologies and receive the positioning reference signal according to the resolution per use case.

According to an embodiment, upon transmission of the positioning reference signal (PRS), a different numerology may be configured per transmission interval according to each use case, with respect to the single bandwidth part (BWP). For example, configuration of different numerologies and transmission of the positioning reference signal (PRS) based on TDM may be rendered possible. That is, in the same bandwidth part among a plurality of bandwidth parts constituting the system bandwidth, a positioning reference signal (PRS) transmission interval with a different resolution per time interval may be configured. In this case, numerology information and time interval information may be added to the positioning reference signal (PRS) configuration information.

Thus, the receiver 2310 may receive positioning reference signals (PRS) with different resolutions in different time intervals even in the single bandwidth part (BWP). At this time, adjustment of different resolutions may be achieved via numerology, as described above, under the assumption that the positioning reference signal (PRS) patterns are the same.

According to an embodiment, where the positioning reference signal (PRS) is transmitted based on multiple bandwidth parts (BWPs), a different numerology may be configured per bandwidth part (BWP) depending on the use case. Multiple BWP simultaneous transmission-based different numerologies may be configured and, thus, the receiver 2310 may receive the positioning reference signal (PRS).

As an example, the positioning reference signal (PRS) may be transmitted simultaneously in all the bandwidth parts (BWPs). That is, the base station may configure and transmit the positioning reference signal (PRS) based on a different numerology per bandwidth part (BWP). By so doing, positioning reference signals (PRSs) satisfying various resolution requirements may be simultaneously transmitted.

In this case, since configuration information may be received via each bandwidth part (BWP) for the positioning reference signal (PRS), no separate higher layer configuration information for transmission of the positioning reference signal (PRS) may be required. However, even in this case, bandwidth part (BWP) index and numerology value, other than the existing positioning reference signal (PRS) configuration information, may be included.

However, this is merely an example, and embodiments of the disclosure are not limited thereto. For example, the receiver 2310 may receive the positioning reference signal (PRS) based on different numerologies according to the UE's capability and use cases for some of the plurality of bandwidth parts (BWPs) constituting the system bandwidth.

According to an example, the receiver 2310 may receive the transmitted positioning reference signal (PRS) based on the numerology meeting several resolution requirements considering the capability of each UE. The base station may perform simultaneous transmission by simultaneously repeating positioning reference signals (PRSs), which have the same resolution requirement, on several bandwidth parts (BWPs).

Referring back to FIG. 23, the receiver 2310 may receive the positioning reference signal based on the configuration information for the subcarrier spacing.

The receiver 2310 may receive the positioning reference signal based on the configuration information for the subcarrier spacing received from the base station. As an example, the receiver 2310 may further receive configuration information for the transmission bandwidth for the positioning reference signal from the base station, receiving the positioning reference signal. For example, it is assumed that, for each UE, PDSCH reception is performed via any activated bandwidth part (BWP). In this case, the receiver 2310 may activate a specific bandwidth part (BWP) configured to transmit the positioning reference signal for UE positioning and receive the positioning reference signal.

As an example, where multiple bandwidth parts (BWP) are configured, the receiver 2310 may activate multiple specific bandwidth parts (BWPs) configured to transmit the positioning reference signal for UE positioning and receive the positioning reference signal. In this case, in a specific bandwidth, the receiver 2310 may receive the positioning reference signal in the radio resource allocated to transmission of the positioning reference signal based on the configuration information for the positioning reference signal transmission pattern.

The NR UE may detect the positioning reference signal (PRS) based on the UE's capability. For example, the positioning reference signal (PRS) may be detected based on the UE's capability. Whether the UE receives the multiple bandwidth parts (BWPs) for reception of the positioning reference signal (PRS), the UE's positioning reference signal (PRS) processing time, and reporting capability may be considered as the UE's capability.

As an example, it is assumed that the UE may support the function of receiving multiple bandwidth parts (BWPs) as well as receiving a single bandwidth part (BWP). Also assumed is that there may be mixed UEs supporting only UE bandwidth part (BWP) and UEs supporting multiple bandwidth parts (BWPs) as well, depending on the UE's capability.

In the case of the UE which supports single bandwidth part (BWP) reception capability, the receiver 2310 may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As an example, in the case of the UE which supports multiple bandwidth part (BWP) reception capability, the receiver 2310 may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As another example, the receiver 2310 may receive the positioning reference signal (PRS) in all the bandwidth parts (BWPs) supported in the positioning reference signal (PRS) configuration information. That is, regardless of the use cases for the UE itself, the UE may perform detection on the bandwidth parts (BWPs) where all the positioning reference signals (PRSs) are transmitted. If the same numerology-based positioning reference signal (PRS) is repeatedly transmitted in the multiple bandwidth parts (BWPs), the UE may receive the positioning reference signal (PRS) via the multiple bandwidth parts (BWPs), raising detection accuracy.

According to an example, for positioning the UE, the receiver 2310 may receive a positioning reference signal from each of the serving cell and at least two or more neighboring cells. The controller 2320 may measure reference signal time difference information between the received reference signals. The transmitter 2330 may transmit RSTD information for the positioning reference signals to the base station. The base station may estimate the crossing area based on the RSTD information. Thus, the UE's position may be estimated.

According to the embodiments described above, it is possible to provide a reporting resolution for a positioning reference signal suitable for various use scenarios required in NR by flexibly configuring numerology for the radio resource used in transmission of the positioning reference signal, per time interval or per bandwidth part, in performing positioning in a next-generation wireless network. It is also possible to provide an appropriate reporting resolution according to the UE's circumstance by differently configuring numerology for the radio resource used in transmission of a positioning reference signal based on the UE's capability in performing positioning in a next-generation wireless network. Thus, direct positioning reference signal (PRS) transmission control considering the resolution of the positioning reference signal (PRS) may be rendered possible.

Figure 24:
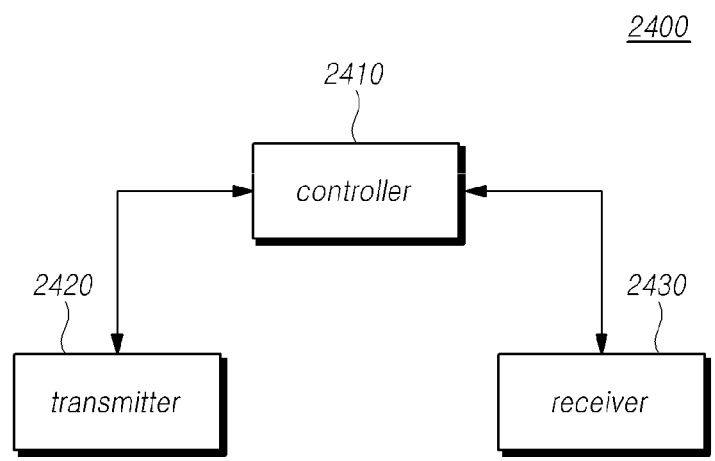
FIG. 24 is a block diagram illustrating a base station according to an embodiment.

FIG. 24 is a block diagram illustrating a base station 2400 according to an embodiment.

Referring to FIG. 24, according to an embodiment, a base station 2400 includes a controller 2410, a transmitter 2420, and a receiver 2430.

The controller 2410 controls the overall operation of the base station 2400 according to a method of performing positioning necessary for performing the disclosure as described above. The controller 2410 may configure configuration information for a subcarrier spacing of the frequency band where a positioning reference signal (PRS) is transmitted.

For example, the controller 2410 may configure the positioning reference signal (PRS) based on various numerologies to support different resolutions in relation to transmission of the positioning reference signal (PRS) for positioning of the UE. NR provides a total of five subcarrier spacings corresponding to 15 kHz, 30 kHz, 60 kHz, 120 kHz, and 240 kHz.

As described above, the larger subcarrier spacing value the numerology has, the smaller resolution value one time sample of positioning reference signal (PRS) provides. Thus, the resolution of positioning may increase.

According to an embodiment, the controller 2410 may configure the numerology of the frequency band where the positioning reference signal (PRS) is transmitted based on the resolution of the positioning reference signal (PRS) required per use case. As an example, the transmitter 2420 may transmit the configuration information for the subcarrier spacing for transmission of the positioning reference signal (PRS) via higher layer signaling. As another example, the transmitter 2420 may transmit the configuration information for the subcarrier spacing for transmission of the positioning reference signal (PRS) via a downlink control channel or downlink data channel.

In NR, two subcarrier spacings with respect to a transmission frequency of 6 GHz are used for transmission of data or a reference signal (RS). Selection of two subcarrier spacings may be performed with respect to the transmission frequency of 6 GHz for the positioning reference signal (PRS).

For example, where the transmission frequency is less than 6 GHz, the controller 2410 may set the subcarrier spacing to 15 kHz or 30 kHz. At this time, where a relatively low resolution is required for the positioning reference signal (PRS), the controller 2410 may select a subcarrier spacing of 15 kHz. Where a relatively high resolution is required for the positioning reference signal (PRS), the controller 2410 may select a subcarrier spacing of 30 kHz.

Likewise, where the transmission frequency is not less than 6 GHz, the controller 2410 may set the subcarrier spacing to 60 kHz or 120 kHz. At this time, where a relatively low resolution is required for the positioning reference signal (PRS), the controller 2410 may select a subcarrier spacing of 60 kHz. Where a relatively high resolution is required for the positioning reference signal (PRS), the controller 2410 may select a subcarrier spacing of 120 kHz.

As an example, where the UE simultaneously supports a band not more than 6 GHz and an mmWave band which is not less than 6 GHz, the controller 2410 may integrate all the numerologies for the corresponding UE and apply an appropriate resolution per use case.

According to an embodiment, upon transmission of the positioning reference signal (PRS), the controller 2410 may configure a different numerology per transmission interval according to each use case, with respect to the single bandwidth part (BWP). For example, the controller 2410 may configure a TDM-based different numerology and transmit the positioning reference signal (PRS) via the transmitter 2420. That is, in the same bandwidth part among a plurality of bandwidth parts constituting the system bandwidth, a positioning reference signal (PRS) transmission interval with a different resolution per time interval may be configured. In this case, numerology information and time interval information may be added to the positioning reference signal (PRS) configuration information.

Thus, the transmitter 2420 may transmit positioning reference signals (PRS) with different resolutions in different time intervals even in the single bandwidth part (BWP). At this time, adjustment of different resolutions may be achieved via numerology, as described above, under the assumption that the positioning reference signal (PRS) patterns are the same.

According to another embodiment, where the positioning reference signal (PRS) is transmitted based on multiple bandwidth parts (BWPs), the controller 2410 may configure a different numerology per bandwidth part (BWP) depending on the use case. Multiple BWP simultaneous transmission-based different numerologies may be configured and, thus, the transmitter 2420 may transmit the positioning reference signal (PRS).

For example, the transmitter 2420 may transmit the positioning reference signal (PRS) simultaneously in all the bandwidth parts (BWPs). That is, the transmitter 2420 may transmit the positioning reference signal (PRS) configured based on a different numerology per bandwidth part (BWP). By so doing, positioning reference signals (PRSs) meeting various resolution requirements may be simultaneously transmitted.

In this case, since configuration information may be received via each bandwidth part (BWP) for the positioning reference signal (PRS), no separate higher layer configuration information for transmission of the positioning reference signal (PRS) may be required. However, even in this case, bandwidth part (BWP) index and numerology value, other than the existing positioning reference signal (PRS) configuration information, may be included.

However, this is merely an example, and embodiments of the disclosure are not limited thereto. For example, the controller 2410 may configure the positioning reference signal (PRS) based on different numerologies according to the UE's capability and use cases for some of the plurality of bandwidth parts (BWPs) constituting the system bandwidth and transmit the positioning reference signal (PRS) via the transmitter 2420.

According to an example, the transmitter 2420 may transmit the positioning reference signal (PRS) based on the numerology meeting several resolution requirements considering the capability of each UE. The transmitter 2420 may perform simultaneous transmission by simultaneously repeating positioning reference signals (PRSs), which have the same resolution requirement, on several bandwidth parts (BWPs).

Referring back to FIG. 24, the transmitter 2420 may transmit the positioning reference signal based on the configuration information for the subcarrier spacing.

The transmitter 2420 may transmit the positioning reference signal to the UE based on the configuration information for the subcarrier spacing. According to an example, the transmitter 2420 may further transmit the configuration information for the transmission bandwidth for the positioning reference signal to the UE and may transmit the positioning reference signal based on the configuration information. For example, it is assumed that, for each UE, PDSCH reception is performed via any activated bandwidth part (BWP). In this case, each UE may activate a specific bandwidth part (BWP) configured to transmit the positioning reference signal for UE positioning and receive the positioning reference signal.

According to an example, where multiple bandwidth parts (BWP) are configured, each UE may activate multiple specific bandwidth parts (BWPs) configured to transmit the positioning reference signal for UE positioning and receive the positioning reference signal. In this case, in a specific bandwidth, the UE may receive the positioning reference signal in the radio resource allocated to transmission of the positioning reference signal based on the configuration information for the positioning reference signal transmission pattern.

The NR UE may detect the positioning reference signal (PRS) based on the UE's capability. For example, the positioning reference signal (PRS) may be detected based on the UE's capability. Whether the UE receives the multiple bandwidth parts (BWPs) for reception of the positioning reference signal (PRS), the UE's positioning reference signal (PRS) processing time, and reporting capability may be considered as the UE's capability.

For example, it is assumed that the UE may support the function of receiving multiple bandwidth parts (BWPs) as well as receiving a single bandwidth part (BWP). Also assumed is that there may be mixed UEs supporting only UE bandwidth part (BWP) and UEs supporting multiple bandwidth parts (BWPs) as well, depending on the UE's capability.

The UE which supports single bandwidth part (BWP) reception capability may select only the bandwidth part (BWP) appropriate to the use case for the UE itself, of the positioning reference signal (PRS) configuration information, and receive the positioning reference signal. In this case, the UE may disregard the positioning reference signals (PRSs) transmitted in the other bandwidth parts (BWPs).

As an example, the UE which supports multiple bandwidth part (BWP) reception capability may select only the bandwidth part (BWP) meeting the use case for the UE itself, of the positioning reference signal (PRS) configuration information, and receive the positioning reference signal. In this case, the UE may disregard the positioning reference signals (PRSs) transmitted in the other bandwidth parts (BWPs).

As an example, the UE may receive the positioning reference signal (PRS) in all the bandwidth parts (BWPs) supported in the positioning reference signal (PRS) configuration information. That is, regardless of the use cases for the UE itself, the UE may perform detection on the bandwidth parts (BWPs) where all the positioning reference signals (PRSs) are transmitted. If the same numerology-based positioning reference signal (PRS) is repeatedly transmitted in the multiple bandwidth parts (BWPs), the UE may receive the positioning reference signal (PRS) via the multiple bandwidth parts (BWPs), raising detection accuracy.

According to an example, for positioning the UE, the UE may receive a positioning reference signal from each of the serving cell and at least two or more neighboring cells. The UE may measure reference signal time difference information between the received reference signals. The receiver 2430 may receive the RSTD information for the positioning reference signal from the UE. The controller 2410 may estimate the crossing area based on the RSTD information. Thus, the UE's position may be estimated.

According to the embodiments described above, it is possible to provide a reporting resolution for a positioning reference signal suitable for various use scenarios required in NR by flexibly configuring numerology for the radio resource used in transmission of the positioning reference signal, per time interval or per bandwidth part, in performing positioning in a next-generation wireless network. It is also possible to provide an appropriate reporting resolution according to the UE's circumstance by differently configuring numerology for the radio resource used in transmission of a positioning reference signal based on the UE's capability in performing positioning in a next-generation wireless network. Thus, direct positioning reference signal (PRS) transmission control considering the resolution of the positioning reference signal (PRS) may be rendered possible.

The embodiments have been described as the UE receives the configuration information for the subcarrier spacing in the frequency band where the positioning reference signal (PRS) is transmitted from the base station. Hereinafter, another embodiment of the disclosure will be described, in which configuration information for the subcarrier spacing of the frequency band in which a positioning reference signal (PRS) is transmitted is not separately received. No duplicate description is given below, but what has been described above may be applied in substantially the same manner unless contradictory.

Figure 25:
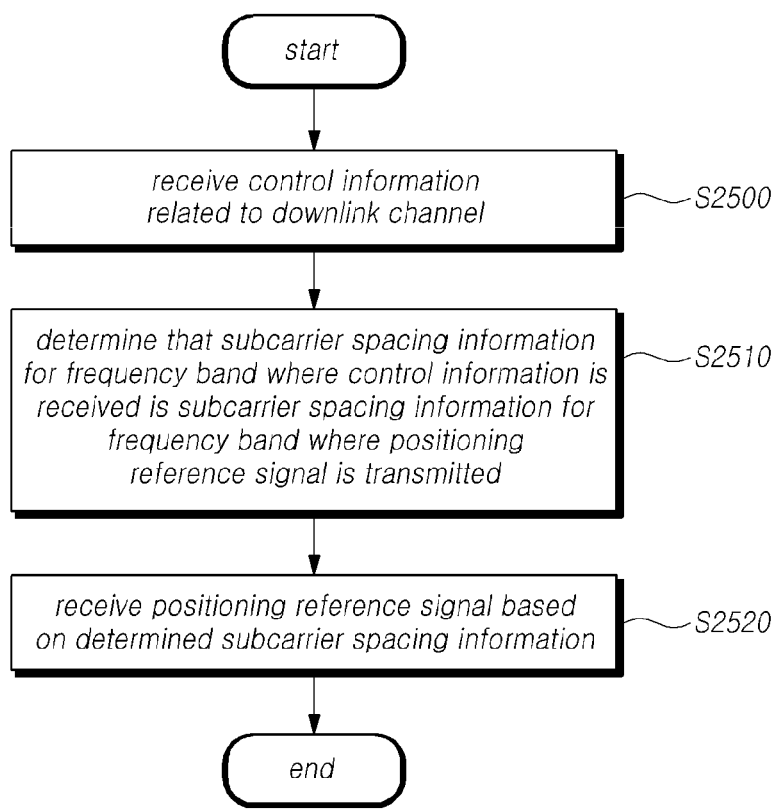
FIG. 25 is a flowchart illustrating operations of a user equipment according to another embodiment of the disclosure.

FIG. 25 is a flowchart illustrating a procedure of a UE for performing positioning according to another embodiment.

Referring to FIG. 25, the UE may receive control information related to a downlink channel (S2500). For example, the downlink channel-related control information may be previously set as at least one of the synchronization signal block (SSB) or control channel related to, e.g., the PDCCH where control resource set #0 (CORESET #0) is received, the PBCH where the synchronization signal block (SSB) is received, or the PDSCH where remaining minimum system information (RMSI) is received.

Referring back to FIG. 25, the UE may determine that the subcarrier spacing information for the frequency band where the control information has been received is the subcarrier spacing information for the frequency band where the positioning reference signal is transmitted (S2510). That is, the UE may determine that a positioning reference signal is to be transmitted using the subcarrier spacing information for the frequency band where predetermined control information is received.

Referring back to FIG. 25, the UE may receive a positioning reference signal from the base station based on the determined subcarrier spacing information (S2520).

According to the embodiment described above, even when subcarrier spacing information for the frequency band where the positioning reference signal is transmitted is not separately configured, transmission of the positioning reference signal to the UE may be performed.

Figure 26:
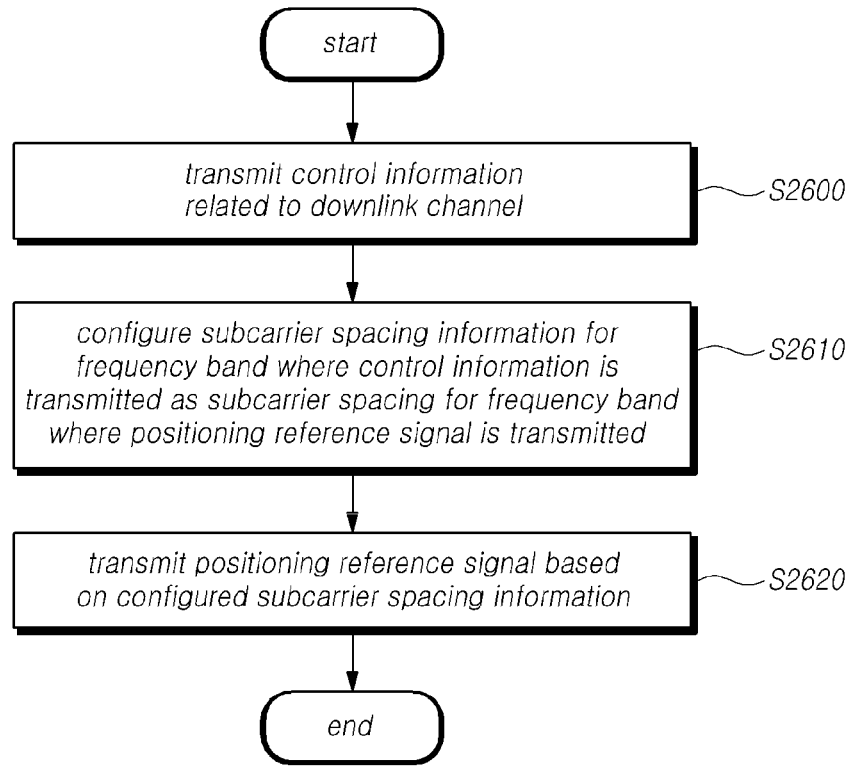
FIG. 26 is a flowchart illustrating operations of a base station according to another embodiment of the disclosure.

FIG. 26 is a flowchart illustrating a procedure of a base station performs positioning according to another embodiment.

Referring to FIG. 26, the base station may transmit control information related to a downlink channel to the UE (S2600). For example, the downlink channel-related control information may be previously set as at least one of the synchronization signal block (SSB) or control channel related to, e.g., the PDCCH where control resource set #0 (CORESET #0) is received, the PBCH where the synchronization signal block (SSB) is received, or the PDSCH where remaining minimum system information (RMSI) is received.

Referring back to FIG. 26, the base station may configure the subcarrier spacing information for the frequency band where control information is transmitted as the subcarrier spacing information for the frequency band where the positioning reference signal is transmitted (S2610). That is, the base station may be configured to transmit the positioning reference signal using the subcarrier spacing information for the frequency band where predetermined control information has been transmitted.

Referring back to FIG. 26, the base station may transmit the positioning reference signal to the UE based on the configured subcarrier spacing information (S2620).

According to the embodiment described above, even when subcarrier spacing information for the frequency band where the positioning reference signal is transmitted is not separately configured, transmission of the positioning reference signal to the UE may be performed.

According to another embodiment of the disclosure, referring to FIG. 23, the receiver 2310 of the UE may receive control information related to a downlink channel. For example, the downlink channel-related control information may be previously set as at least one of the synchronization signal block (SSB) or control channel related to, e.g., the PDCCH where control resource set #0 (CORESET #0) is received, the PBCH where the synchronization signal block (SSB) is received, or the PDSCH where remaining minimum system information (RMSI) is received.

The controller 2320 of the UE may determine that the subcarrier spacing information for the frequency band where the control information has been received is the subcarrier spacing information for the frequency band where the positioning reference signal is transmitted. That is, the controller 2320 may determine that a positioning reference signal is to be transmitted using the subcarrier spacing information for the frequency band where predetermined control information is received.

In this case, the receiver 2310 may receive the positioning reference signal based on the determined subcarrier spacing information.

Accordingly, even when subcarrier spacing information for the frequency band where the positioning reference signal is transmitted is not separately configured, transmission of the positioning reference signal to the UE may be performed.

According to another embodiment of the disclosure, referring to FIG. 24, the transmitter 2420 of the base station may transmit control information related to a downlink channel to the UE. For example, the downlink channel-related control information may be previously set as at least one of the synchronization signal block (SSB) or control channel related to, e.g., the PDCCH where control resource set #0 (CORESET #0) is received, the PBCH where the synchronization signal block (SSB) is received, or the PDSCH where remaining minimum system information (RMSI) is received.

The controller 2410 of the base station may configure the subcarrier spacing information for the frequency band where the control information is transmitted as the subcarrier spacing information for the frequency band where the positioning reference signal is transmitted. That is, the controller 2410 may be configured to transmit the positioning reference signal using the subcarrier spacing information for the frequency band where predetermined control information has been transmitted.

The transmitter 2420 may transmit the positioning reference signal to the UE based on the configured subcarrier spacing information.

According to this, even when subcarrier spacing information for the frequency band where the positioning reference signal is transmitted is not separately configured, transmission of the positioning reference signal to the UE may be performed.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:

1. A method for performing positioning by a user equipment (UE), the method comprising:
receiving configuration information for a subcarrier spacing of a frequency band where a positioning reference signal (PRS) is transmitted; and
receiving the PRS based on the configuration information for the subcarrier spacing,
wherein the configuration information for the subcarrier spacing is configured for each time interval of transmitting the PRS,
wherein the configuration information for the subcarrier spacing is included in configuration information for the PRS, and
wherein the configuration information for the PRS includes information on a number of symbols and starting point of the symbols in which the PRS is transmitted in the time domain, and information on a number of resource elements (REs) per symbol and starting point of the REs in which the PRS is transmitted in the frequency domain, based on a slot through which the PRS is transmitted.

2. The method of claim 1, wherein
the configuration information for the subcarrier spacing is received via higher layer signaling.

3. The method of claim 1, wherein
the receiving the PRS comprises:
receiving the PRS based on a configuration information related to at least one bandwidth part (BWP) configured for the UE.

4. The method of claim 1, wherein
the receiving the PRS includes receiving the PRS according to the subcarrier spacing determined based on capability of the UE.

5. A method for performing positioning by a base station, the method comprising:
configuring configuration information for a subcarrier spacing of a frequency band where a positioning reference signal (PRS) is transmitted; and
transmitting the PRS based on the configuration information for the subcarrier spacing,
wherein the configuration information for the subcarrier spacing is configured for each time interval of transmitting the PRS,
wherein the configuration information for the subcarrier spacing is included in configuration information for the PRS,
wherein the configuration information for the PRS includes information on a number of symbols and starting point of the symbols in which the PRS is transmitted in the time domain, and information on a number of resource elements (REs) per symbol and starting point of the REs in which the PRS is transmitted in the frequency domain, based on a slot through which the PRS is transmitted.

6. The method of claim 5, wherein
the configuration information for the subcarrier spacing is transmitted via higher layer signaling.

7. The method of claim 5, further comprising
transmitting a configuration information related to at least one bandwidth part (BWP) configured for UE.

8. The method of claim 5, wherein
the transmitting the PRS includes transmitting the PRS according to the subcarrier spacing determined based on capability of UE.

9. A user equipment (UE) for performing positioning, the UE comprising:
a receiver configured to receive configuration information for a subcarrier spacing of a frequency band where a positioning reference signal (PRS) is transmitted and receive the PRS based on the configuration information for the subcarrier spacing,
wherein the configuration information for the subcarrier spacing is configured for each time interval when the PRS is transmitted,
wherein the configuration information for the subcarrier spacing is included in configuration information for the PRS, and wherein the configuration information for the PRS includes information on a number of symbols and starting point of the symbols in which the PRS is transmitted in the time domain, and information on a number of resource elements (REs) per symbol and starting point of the REs in which the PRS is transmitted in the frequency domain, based on a slot through which the PRS is transmitted.

10. The UE of claim 9, wherein
the configuration information for the subcarrier spacing is received via higher layer signaling.

11. The UE of claim 9, wherein
the receiver configured to receive the PRS based on a configuration information related to at least one bandwidth part (BWP) configured for the UE.

12. The UE of claim 9, wherein
the receiver receives the PRS according to the subcarrier spacing determined based on capability of the UE.

* * * * *